United States Patent
Higashidozono et al.

(10) Patent No.: US 11,603,832 B2
(45) Date of Patent: Mar. 14, 2023

(54) CAPACITY CONTROL VALVE HAVING A THROTTLE VALVE PORTION WITH A COMMUNICATION HOLE

(71) Applicant: EAGLE INDUSTRY CO., LTD., Tokyo (JP)

(72) Inventors: Hideki Higashidozono, Tokyo (JP); Masahiro Hayama, Tokyo (JP)

(73) Assignee: EAGLE INDUSTRY CO., LTD.

( * ) Notice: Subject to any disclaimer, the term of this patent is extended or adjusted under 35 U.S.C. 154(b) by 851 days.

(21) Appl. No.: 16/480,281

(22) PCT Filed: Jan. 24, 2018

(86) PCT No.: PCT/JP2018/002084
§ 371 (c)(1),
(2) Date: Jul. 23, 2019

(87) PCT Pub. No.: WO2018/139476
PCT Pub. Date: Aug. 2, 2018

(65) Prior Publication Data
US 2020/0032781 A1   Jan. 30, 2020

(30) Foreign Application Priority Data
Jan. 26, 2017   (JP) .............................. JP2017-012588

(51) Int. Cl.
*F04B 27/18* (2006.01)
*F16K 11/02* (2006.01)
*F16K 31/06* (2006.01)

(52) U.S. Cl.
CPC .......... *F04B 27/1804* (2013.01); *F16K 11/02* (2013.01); *F04B 2027/1827* (2013.01);
(Continued)

(58) Field of Classification Search
CPC .......... F04B 27/1804; F04B 2027/1827; F04B 2027/1831; F04B 2027/1845;
(Continued)

(56) References Cited

U.S. PATENT DOCUMENTS

| 1,614,002 A | 1/1927 | Horton ................ A62C 35/605 |
| 2,267,515 A | 12/1941 | Wilcox ............... F16K 31/0627 |

(Continued)

FOREIGN PATENT DOCUMENTS

| CN | 111279076 | 6/2020 | ............. F04B 27/18 |
| CN | 111316028 | 6/2020 | ............. F16K 31/06 |

(Continued)

OTHER PUBLICATIONS

U.S. Appl. No. 16/480,281, filed Jul. 23, 2019, Higashidozono et al.
(Continued)

*Primary Examiner* — Nathan C Zollinger
*Assistant Examiner* — Timothy P Solak
(74) *Attorney, Agent, or Firm* — Hayes Soloway P.C.

(57) ABSTRACT

A capacity control valve is provided with a throttle valve portion having a communication hole and a second valve hole. The communication hole is provided between a second valve portion and a third valve portion and makes an intermediate communication passage communicate with a third valve chamber. The second valve hole is provided between a second valve chamber and the third valve chamber. An amount of narrowing of the throttle valve portion in relation to a stroke of a valve element is set larger when the second valve portion initially opens by separating from a second valve seat face, and then becomes narrower after the initial opening of the valve. The capacity control valve is capable of shortening a start-up time and improving the operating efficiency of a variable capacity compressor.

8 Claims, 10 Drawing Sheets

(52) U.S. Cl.
CPC ............... *F04B 2027/1831* (2013.01); *F04B 2027/1845* (2013.01); *F16K 31/06* (2013.01)

(58) Field of Classification Search
CPC ...... F04B 2027/1809; F04B 2027/1813; F04B 2027/1818; F04B 2027/185; F16K 11/02
See application file for complete search history.

(56) References Cited

U.S. PATENT DOCUMENTS

| | | | |
|---|---|---|---|
| 3,360,304 A | 12/1967 | Adams | B61K 7/12 |
| 3,483,888 A | 12/1969 | Hugo | F16K 15/046 |
| 4,364,615 A | 12/1982 | Euler | F16C 27/04 |
| 4,579,145 A | 4/1986 | Leiber | F16H 61/0251 |
| 4,615,358 A | 10/1986 | Hammond | F16B 13/0402 |
| 4,895,192 A | 1/1990 | Mortenson | F01M 11/04 |
| 4,917,150 A | 4/1990 | Koch | F16K 31/0606 |
| 4,979,542 A | 12/1990 | Mesenich | F01M 47/027 |
| 4,998,559 A | 3/1991 | McAuliffe | F16H 61/0251 |
| 5,060,695 A | 10/1991 | McCabe | G05D 16/2024 |
| 5,217,047 A | 6/1993 | McCabe | F16H 16/0251 |
| 5,263,694 A | 11/1993 | Smith | B60G 15/068 |
| 5,702,235 A | 12/1997 | Hirota | F04B 27/1804 |
| 5,778,932 A | 7/1998 | Alexander | G05D 16/2024 |
| 6,010,312 A | 1/2000 | Suitou | F04B 27/1804 |
| 6,161,585 A | 12/2000 | Kolchinsky | F05D 16/2024 |
| 6,361,283 B1 | 3/2002 | Ota | F04B 27/1804 |
| 6,481,976 B2 | 11/2002 | Kimura | F04B 27/1804 |
| 7,533,687 B2 | 5/2009 | Uemura | F16K 27/048 |
| 8,021,124 B2 | 9/2011 | Umemura | F04B 27/1804 |
| 8,079,827 B2 * | 12/2011 | Iwa | F04B 27/1804 417/222.2 |
| 8,225,818 B1 | 7/2012 | Stephens | F15B 13/0442 |
| 8,651,826 B2 | 2/2014 | Futakuchi | F04B 27/1804 |
| 9,022,346 B2 | 5/2015 | Najmolhoda | F16K 31/0613 |
| 9,027,598 B2 | 5/2015 | Schneider | F16K 31/0613 |
| 9,132,714 B2 | 9/2015 | Futakuchi | F04B 27/1804 |
| 9,297,373 B2 | 3/2016 | Bagagli | F16K 15/026 |
| 9,400,027 B2 | 7/2016 | Imaizumi | F16F 1/32 |
| 9,453,518 B2 | 9/2016 | Schulz | F15B 13/043 |
| 9,581,149 B2 | 2/2017 | Ota et al. | F04B 27/1804 |
| 9,581,150 B2 | 2/2017 | Ota et al. | F04B 27/1804 |
| 9,732,874 B2 | 8/2017 | Saeki | F16K 31/0603 |
| 9,874,286 B2 | 1/2018 | Bagagli | F16K 15/12 |
| 10,113,539 B2 | 10/2018 | Sugamura | F04B 27/1804 |
| 10,519,944 B2 | 12/2019 | Taguchi | F04B 27/1804 |
| 10,557,463 B2 | 2/2020 | Sugamura | F04B 27/1804 |
| 10,690,125 B2 | 6/2020 | Hayama | F04B 27/18 |
| 10,784,804 B2 | 9/2020 | Sasaki | H01P 25/022 |
| 10,837,431 B2 | 11/2020 | Tonegawa | F04B 49/22 |
| 2001/0003573 A1 | 6/2001 | Kimura et al. | 417/222.2 |
| 2002/0134444 A1 | 9/2002 | Isobe | F16K 27/041 |
| 2003/0145615 A1 | 8/2003 | Sasaki | F16K 31/0637 |
| 2003/0202885 A1 | 10/2003 | Taguchi | F04B 49/00 |
| 2004/0045305 A1 | 3/2004 | Murase | F25B 49/022 |
| 2004/0165994 A1 | 8/2004 | Umemura | F04B 27/1804 |
| 2005/0076959 A1 | 4/2005 | Yamamoto | F16K 31/0624 |
| 2005/0151310 A1 | 7/2005 | Rodeffer | F16F 1/32 |
| 2007/0214814 A1 | 9/2007 | Umemura et al. | |
| 2007/0264134 A1 | 11/2007 | Hirota | F04B 27/1804 |
| 2008/0138213 A1 | 6/2008 | Umemura et al. | 417/222.2 |
| 2008/0175727 A1 | 7/2008 | Umemura et al. | F04B 49/22 |
| 2009/0108221 A1 | 4/2009 | Umemura et al. | 251/129.15 |
| 2009/0114871 A1 | 5/2009 | Iwa | F04B 27/14 |
| 2009/0183786 A1 | 7/2009 | Iwa et al. | |
| 2009/0256091 A1 | 10/2009 | Nordstrom | F16K 31/0613 |
| 2010/0282991 A1 | 11/2010 | Okamoto | F16K 31/02 |
| 2011/0061749 A1 | 3/2011 | Okamoto | F16K 31/0655 |
| 2011/0089352 A1 | 4/2011 | Morgan | F16K 11/0716 |
| 2012/0056113 A1 * | 3/2012 | Tano | F04B 27/1804 251/25 |
| 2012/0198992 A1 | 8/2012 | Futakuchi et al. | 91/505 |
| 2012/0198993 A1 | 8/2012 | Fukudome | 91/505 |
| 2012/0211686 A1 | 8/2012 | Okamoto | F16K 31/0655 |
| 2013/0291963 A1 | 11/2013 | Futakuchi et al. | 137/487.5 |
| 2014/0099214 A1 | 4/2014 | Fukudome | 417/222.2 |
| 2014/0130916 A1 | 5/2014 | Saeki | F16K 31/0613 |
| 2014/0294632 A1 | 10/2014 | Kondo et al. | 417/434 |
| 2014/0369862 A1 | 12/2014 | Ota et al. | F04B 27/1804 |
| 2015/0021131 A1 | 1/2015 | Wootten | F16F 9/348 |
| 2015/0027573 A1 | 1/2015 | Ochiai | F15B 13/0402 |
| 2015/0044067 A1 | 2/2015 | Ota et al. | F04B 27/1804 |
| 2015/0068628 A1 | 3/2015 | Iwa | 137/625.65 |
| 2015/0104334 A1 | 4/2015 | Ota et al. | F04B 27/1804 |
| 2015/0275874 A1 * | 10/2015 | Ota | F04B 27/1804 417/222.1 |
| 2015/0345655 A1 | 12/2015 | Higashidozono | 137/624.27 |
| 2016/0053755 A1 | 2/2016 | Taguchi | F04B 49/22 |
| 2016/0290326 A1 | 10/2016 | Sugamura | F04B 27/1804 |
| 2017/0284562 A1 | 10/2017 | Hayama | F16K 41/00 |
| 2018/0156345 A1 | 6/2018 | Kanda | F15B 13/0431 |
| 2018/0187793 A1 | 7/2018 | Futakuchi | F04B 39/08 |
| 2018/0291888 A1 | 10/2018 | Tonegawa et al. | F04B 49/22 |
| 2019/0162175 A1 | 5/2019 | Higashidozono | F04B 27/18 |
| 2020/0032781 A1 | 1/2020 | Higashidozono | F16K 31/0624 |
| 2020/0309105 A1 | 10/2020 | Hayama et al. | F04B 27/18 |
| 2020/0318624 A1 | 10/2020 | Hayama | F04B 27/18 |
| 2020/0332786 A1 | 10/2020 | Hayama | F04B 27/1804 |
| 2020/0362974 A1 | 11/2020 | Hayama et al. | F16K 11/24 |
| 2020/0370545 A1 | 11/2020 | Hayama et al. | F04B 27/18 |
| 2021/0372396 A1 | 12/2021 | Kurihara | G05D 7/0635 |

FOREIGN PATENT DOCUMENTS

| | | | |
|---|---|---|---|
| CN | 111417780 | 7/2020 | ............ F04B 27/18 |
| EP | 2594794 | 5/2013 | ............ F04B 27/18 |
| EP | 3726054 | 10/2020 | ............ F04B 27/18 |
| JP | 6-26454 | 2/1994 | ............ F04B 27/08 |
| JP | 2001165055 | 6/2001 | ............ F04B 27/14 |
| JP | 2004003468 A | 1/2004 | |
| JP | 2005307817 | 11/2005 | ............ F04B 27/14 |
| JP | 2007247512 A | 9/2007 | |
| JP | 2008157031 | 7/2008 | ............ F04B 27/14 |
| JP | 2009275550 | 11/2009 | ............ F04B 49/00 |
| JP | 2012144986 | 8/2012 | ............ F04B 27/14 |
| JP | 2012211579 | 11/2012 | ............ F04B 27/14 |
| JP | 5167121 B2 | 3/2013 | |
| JP | 2014080927 | 5/2014 | ............ F04B 27/16 |
| JP | 2014092207 | 5/2014 | ............ F16K 31/06 |
| JP | 2014095463 | 5/2014 | ............ F16K 31/06 |
| JP | 2014194180 | 10/2014 | ............ F04B 27/14 |
| JP | 201575054 | 4/2015 | ............ F04B 27/14 |
| JP | 20151168 | 5/2015 | ............ F04B 27/14 |
| JP | 2015137546 | 7/2015 | ............ F04B 27/14 |
| JP | 2015178795 | 10/2015 | ............ F04B 24/14 |
| JP | 5983539 | 8/2016 | ............ F04B 27/18 |
| JP | 2016196825 | 11/2016 | ............ F04B 27/18 |
| JP | 2016196876 A | 11/2016 | |
| JP | 2016205404 A | 12/2016 | |
| JP | 6135521 | 5/2017 | ............ F04B 27/18 |
| JP | 2017089832 | 5/2017 | ............ F16K 31/06 |
| JP | 2018179087 | 11/2018 | ............ F16K 31/06 |
| WO | WO2006090760 | 8/2006 | ............ F04B 27/18 |
| WO | 2007119380 A1 | 10/2007 | |
| WO | WO2009025298 | 2/2009 | ............ F16K 31/06 |
| WO | WO2011114841 | 9/2011 | ............ F04B 27/14 |
| WO | WO 2012077439 | 6/2012 | ............ F04B 27/14 |
| WO | WO2014119594 | 8/2014 | ............ F04B 27/14 |
| WO | WO2014148367 | 9/2014 | ............ F16K 31/06 |

OTHER PUBLICATIONS

U.S. Appl. No. 16/483,621, filed Aug. 5, 2019, Higashidozono et al.
U.S. Appl. No. 16/763,800, filed May 13, 2020, Hayama et al.
U.S. Appl. No. 16/766,096, filed May 21, 2020, Kurihara et al.
U.S. Appl. No. 16/957,340, filed Jun. 23, 2020, Hayama et al.
U.S. Appl. No. 16/957,344, filed Jun. 23, 2020, Hayama et al.
U.S. Appl. No. 16/961,620, filed Jul. 10, 2020, Hayama et al.
U.S. Appl. No. 17/293,435, filed May 12, 2021, Hayama et al.
U.S. Appl. No. 16/772,703, filed Jun. 12, 2020, Hayama et al.
U.S. Appl. No. 14/431,270, filed Mar. 25, 2015, Higashidozono et al.

(56) References Cited

OTHER PUBLICATIONS

The First Office Action issued in Chinese Patent Appln. Serial No. 201880081296.0, dated Jul. 5, 2021, with English translation, 9 pages.
Extended European Search Report issued in European Patent Appln. Serial No. 18896700.4, dated Aug. 12, 2021, 8 pages.
European Official Action issued in related European Patent Application Serial No. 18885296.6, dated Jan. 21, 2022, 4 pages.
International Preliminary Report on Patentability issued in PCT/JP2018/047716, dated Jun. 30, 2020, 8 pages.
International Search Report and Written Opinion issued in PCT/JP2018/047716, dated Mar. 26, 2019, with English translation, 14 pages.
International Preliminary Report on Patentability issued in PCT/JP2014/051901, dated Aug. 13, 2015, 7 pages.
International Search Report issued in PCT/JP2014/051901, dated Apr. 18, 2014, 4 pages.
International Preliminary Report on Patentability, International Search Report and Written Opinion issued in PCT/JP2019/045731, dated Feb. 4, 2020, 21 pages.
International Search Report issued in PCT/JP2018/004500, dated May 15, 2018, 12 pages.
International Preliminary Report on Patentability issued in PCT/JP2018/004500, dated Aug. 20, 2019, 4pages.
International Search Report issued in PCT/JP2018/041768, dated Jan. 22, 2019, 12 pages.
International Preliminary Report on Patentability issued in PCT/JP2018/041768, dated May 19, 2020, 6 pages.
International Search Report issued in PCT/JP2018/002084, dated Apr. 17, 2018, 11 pages.
International Preliminary Report on Patentability issued in PCT/JP2018/002084, dated Jul. 30, 2019, 4 pages.
International Search Report issued in PCT/JP2018/047693, dated Mar. 19, 2019, 11 pages.
International Preliminary Report on Patentability issued in PCT/JP2018/047693, dated Jun. 30, 2020, 4 pages.
International Search Report issued in PCT/JP2018/047694, dated Mar. 19, 2019, 20 pages.
International Preliminary Report on Patentability issued in PCT/JP2018/047694, dated Jun. 30, 2020, 7 pages.
International Search Report issued in PCT/JP2018/045010, dated Feb. 26, 2019, 11 pages.
International Preliminary Report on Patentability issued in PCT/JP2018/045010, dated Jun. 9, 2020, 4 pages.
International Search Report issued in PCT/JP2019/001569, dated Apr. 16, 2019, 20 pages.
International Preliminary Report on Patentability issued in PCT/JP2019/001569, dated Oct. 15, 2018, 7pages.
Official Action issued in related U.S. Appl. No. 16/957,340, dated Feb. 4, 2022 (18 pgs).
Official Action issued in related U.S. Appl. No. 16/957,340, dated Sep. 20, 2021 (18 pgs).
Notice of Allowance issued in related U.S. Appl. No. 16/961,620, dated Feb. 9, 2022 (6 pgs).
Notice of Allowance issued in related U.S. Appl. No. 16/772,703, dated Oct. 13, 2021 (5 pgs).
Official Action issued in related U.S. Appl. No. 16/961,620, dated Aug. 5, 2021 (7 pgs).
Official Action issued in related U.S. Appl. No. 17/293,435, dated Nov. 23, 2021 (12 pgs).
International Search Report (ISR) dated Apr. 17, 2018, issued for International application No. PCT/JP2018/002084. (2 pages).
European Official Action issued in related European Patent Application Serial No. 18897846.4, dated Apr. 14, 2022 (5 pgs).
European Official Action issued in related European Patent Application Serial No. 19890548.1, dated May 24, 2022 (6 pgs).
European Official Action issued in related European Patent Application Serial No. 18884020.1, dated Jun. 28, 2022 (4 pgs).
Korean Official Action issued in related Korean Patent Application Serial No. 10-2020-7013914, dated Mar. 15, 2022 (5 pgs).
Chinese Office Action issued in Chinese Patent Appln. Serial No. 201880080867.9, dated Mar. 16, 2022, with English translation, 13 pages.
Chinese Office Action issued in Chinese Patent Appln. Serial No. 201880072030.X, dated Jun. 6, 2022, with English translation, 12 pages.
Chinese Office Action issued in Chinese Patent Appln. Serial No. 201980075007.0, dated Jun. 6, 2022, with English translation, 8 pages.
Japanese Office Action issued in Japanese Patent Appln. Serial No. 2019-562060, dated May 10, 2022, with English translation, 8 pages.
Japanese Office Action issued in Japanese Patent Appln. Serial No. 2019-562061, dated May 10, 2022, with English translation, 10 pages.
Japanese Office Action issued in Japanese Patent Appln. Serial No. 2019-559188, dated Jul. 13, 2022, with English translation, 9 pages.
International Search Report and Written Opinion with translation issued in PCT/JP2019/001570, dated Jul. 25, 2019 (19 pages).
International Preliminary Report on Patentability with translation issued in PCT/JP2019/001570, dated Jul. 28, 2020 (6 pages).
International Search Report and Written Opinion with translation issued in PCT/JP2018/043652, dated Feb. 19, 2019 (21 pages).
International Preliminary Report on Patentability with translation issued in PCT/JP2018/043652, dated Jun. 2, 2020 (7 pages).
International Search Report and Written Opinion with translation issued in PCT/JP2018/045782, dated Feb. 26, 2019 (11 pages).
International Preliminary Report on Patentability with translation issued in PCT/JP2018/045782, dated Jun. 16, 2020 (4 pages).
Official Action issued in related U.S. Appl. No. 16/772,703, dated Jul. 21, 2021 (6 pgs).
Official Action issued in related U.S. Appl. No. 17/293,435, dated May 31, 2022 (11 pgs).
Official Action issued in related U.S. Appl. No. 16/961,627, dated Oct. 26, 2021 (24 pgs).
Official Action issued in related U.S. Appl. No. 16/766,124, dated Oct. 27, 2021 (11 pgs).
Notice of Allowance issued in related U.S. Appl. No. 16/766,124, dated Apr. 4, 2022 (5 pgs).
Notice of Allowance issued in related U.S. Appl. No. 16/957,340, dated May 24, 2022 (16 pgs).
Notice of Allowance issued in related U.S. Appl. No. 16/961,627, dated May 5, 2022 (19 pgs).
Official Action issued in related U.S. Appl. No. 16/957,344, dated Mar. 29, 2022 (19 pgs).
Official Action issued in related U.S. Appl. No. 16/763,800, dated Jun. 8, 2022 (9 pgs).
Official Action issued in related US Application U.S. Appl. No. 16/766,096, dated May 27, 2022 (7 pgs).
Official Action issued in related U.S. Appl. No. 16/771,548, dated Dec. 8, 2021 (15 pgs).
Official Action issued in related U.S. Appl. No. 16/771,548, dated Jun. 7, 2022 (11 pgs).
Official Action issued in related U.S. Appl. No. 16/483,621, dated Jun. 17, 2022 (13 pgs).

* cited by examiner

FIG. 2
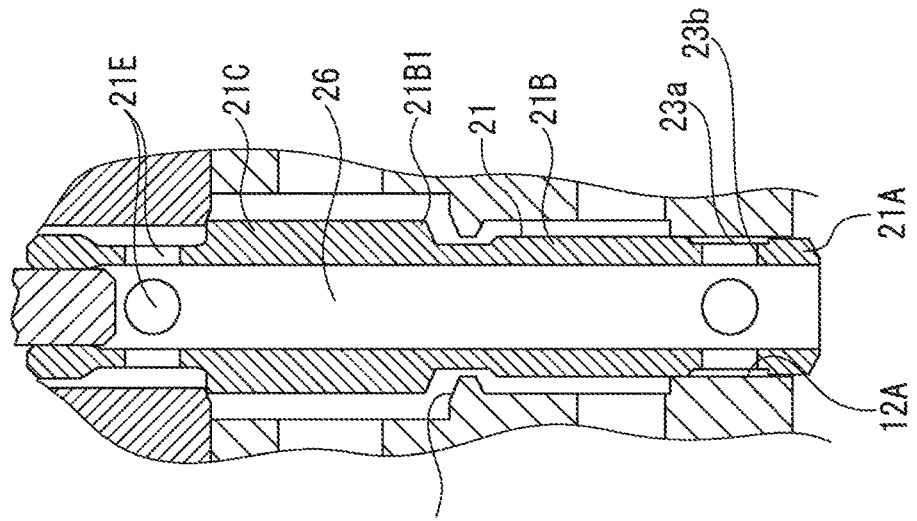
(c) WHEN OFF
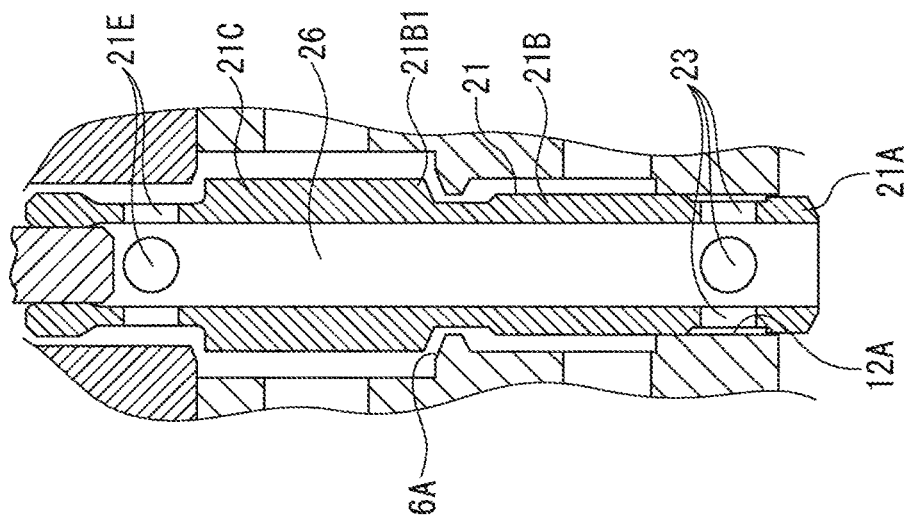
(b) DURING CONTROL
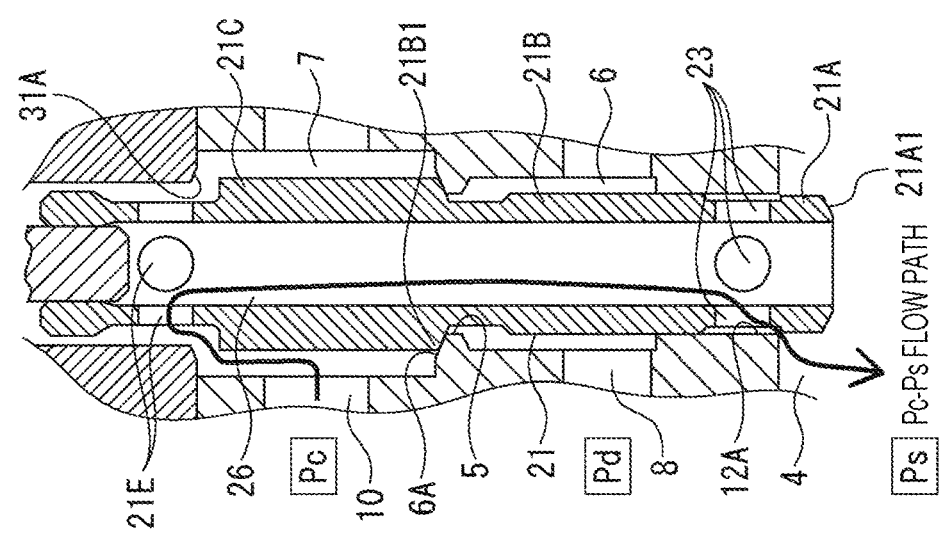
(a) DURING LIQUEFIED REFRIGERANT DISCHARGE

CAPACITY CONTROL VALVE HAVING A THROTTLE VALVE PORTION WITH A COMMUNICATION HOLE

CROSS-REFERENCE TO RELATED APPLICATIONS

This application is the U.S. National Phase under 35 U.S.C. § 371 of International Application PCT/JP2018/002084, filed Jan. 24, 2018, which claims priority to Japanese Patent Application No. 2017-012588, filed Jan. 26, 2017. The International Application was published under PCT Article 21(2) in a language other than English.

TECHNICAL FIELD

The present invention relates to a capacity control valve for variably controlling the capacity or pressure of a working fluid, and particularly relates to a capacity control valve for controlling, in accordance with a pressure load, the discharge rate of a variable capacity compressor or the like suitable for an air conditioning system of an automobile or the like.

BACKGROUND ART

A swash plate type variable capacity compressor suitable for an air-conditioning system of an automobile or the like includes a rotating shaft rotationally driven by a rotational force of an engine, a swash plate coupled to the rotating shaft such that the plate's angle of inclination can be varied, a piston for compression coupled to the swash plate, and the like. By varying the angle of inclination of the swash plate to vary the stroke of the piston, the compressor controls the discharge rate of a refrigerant gas.

The angle of inclination of the swash plate can be continuously varied by appropriately controlling the pressure inside the control chamber using a capacity control valve that is opened and closed by electromagnetic force, and thereby regulating the balance of pressures acting on opposite faces of the piston, while utilizing a suction pressure of a suction chamber for drawing in the refrigerant, a discharge pressure of a discharge chamber for discharging the refrigerant pressurized by the piston, and a control chamber pressure of a control chamber (a crank chamber) in which the swash plate is housed.

As an example of this type of capacity control valve, as shown in FIG. 8, a valve is known that includes a second communication passage 173 and a valve hole 177 providing communication between a discharge chamber and a control chamber; a second valve chamber 182 formed in the middle of a discharge-side passage; a third communication passage 171 and a flow channel 172 providing communication between a suction chamber and the control chamber; a third valve chamber 183 formed in the middle of a suction-side passage; a valve element 181 formed such that a second valve portion 176, disposed in the second valve chamber 182 and opening and closing the second communication passage 173 and the valve hole 177, and a third valve portion 175, disposed in the third valve chamber 183 and opening and closing the third communication passage 171 and the flow channel 172, move in reciprocating motion as a single unit, with one of the second valve portion 176 and the third valve portion 175 performing its opening operation at the same time that the other performs its closing operation; a first valve chamber 184 formed near the control chamber; a pressure-sensitive element (a bellows) 178 disposed in the first valve chamber, exerting a biasing force in a direction of extension (expansion) and contracting in accordance with an increase in pressure in its environment; a valve seat body (an engaging portion) 180 provided on a free end of the pressure-sensitive element in the extension and contraction direction and having an annular seat face; a first valve portion (a valve opening coupling portion) 179 moving in the first valve chamber 184 as a single unit with the valve element 181 and capable of opening and closing the suction-side passage by engaging with and disengaging from the valve seat body 180; a solenoid S exerting an electromagnetic driving force on the valve element 181; and the like. (Hereinafter referred to as "conventional art". For example, see Patent Citation 1.)

Further, even though a clutch mechanism is not provided in the variable capacity compressor, in a case where it becomes necessary to vary the control chamber pressure Pc while capacity control is in progress, a capacity control valve 170 is able to adjust the pressure inside the control chamber (the control chamber pressure) by making the discharge chamber and the control chamber communicate with one another. The capacity control valve 170 is also configured such that, in a case where the control chamber pressure Pc has increased while the variable capacity compressor is in a stopped state, the first valve portion (the valve opening coupling portion) 179 disengages from the valve seat body (the engaging portion) 180, thereby opening the suction-side passage and making the suction chamber and the control chamber communicate with one another.

Note that in a case where the swash plate type variable capacity compressor is stopped and left inoperative for a long period of time, liquefied refrigerant (refrigerant gas that has been liquefied by cooling while the compressor is inoperative) accumulates in the control chamber (the crank chamber). As long as the liquefied refrigerant is not discharged, the refrigerant gas cannot be compressed when the compressor is restarted, and the pre-set discharge rate cannot be ensured. In order for the desired capacity control to be performed immediately after the compressor is restarted, it is necessary for the liquefied refrigerant to be discharged from the control chamber (the crank chamber) as quickly as possible.

Therefore, the conventional art described above is configured such that an auxiliary communication passage 179 is provided in the valve seat body (the engaging portion) 180, thereby making communication possible from the first valve chamber 184, through the auxiliary communication passage 185, an intermediate communication passage 186, and the flow channel 172, to the third communication passage 171, which is in a state of being at the suction chamber pressure. Thus, when the variable capacity compressor is started for cooling, the liquefied refrigerant is discharged from the control chamber (the crank chamber) to the suction chamber, as shown by the arrow in FIG. 8, thereby vaporizing the refrigerant liquid in the control chamber. This enables the compressor to be brought into a cooling operation in from one-fifteenth to one-tenth the time required by a capacity control valve in which the auxiliary communication passage 185 is not provided.

FIG. 8 shows a state in which electric current is supplied to the solenoid S, release spring means 187 has contracted, and the third valve portion 175 has opened. In contrast, when electric current is not supplied to the solenoid S, the release spring means 187 extends, such that the third valve portion 175 closes, the second valve portion 176 is brought into an open state, and the first valve portion 179 opens under the suction chamber pressure Ps and the control chamber pressure Pc.

Further, when the compressor starts, the refrigerant liquid in the control chamber vaporizes, and fluid under the control chamber pressure Pc flows from a first communication passage 174 to the first valve chamber 184. In this state, the suction chamber pressure Ps and the control chamber pressure Pc are high, such that the pressure-sensitive element (the bellows) 178 contracts and a gap opens between the first valve portion 179 and the valve seat body 180. However, the size of the opening between the first valve portion 179 and the valve seat body 180 is functionally restricted, so the vaporization of the refrigerant liquid in the first valve chamber 184 is accelerated only slightly by the opening of the valve. Accordingly, the refrigerant liquid in the control chamber can be made to vaporize much faster by providing the auxiliary communication passage 185, which communicates with the intermediate communication passage 186.

However, a problem exists with the conventional art described above. For example, when the liquefied refrigerant has been completely discharged from the control chamber (the crank chamber) and the variable capacity compressor has shifted to controlling operation, even if the gap between the first valve portion 179 and the valve seat face of the valve seat body 18 is in a closed state, and the auxiliary communication passage 185 communicating with the intermediate communication passage 186, remains open, so the refrigerant gas flows from the control chamber to the suction chamber through the auxiliary communication passage 185 and the intermediate communication passage 186. This leads to a decrease in the operating efficiency of the variable capacity compressor.

This point will be explained in detail with reference to FIGS. 8 to 10. In FIGS. 8 to 10, where S1 is the (constant) area of the auxiliary communication passage 185, S2 is the maximum opening area of the third valve portion 175, L is the maximum stroke of the valve element 181 (the stroke from completely closed to completely open), and Lm is the stroke of the valve element 181 in a control region, the values are set in the conventional art are as follows:

$$S2 \geq S1$$

$$L > Lm$$

Accordingly, as shown by the solid line in FIG. 10, the refrigerant gas, which is determined by the area S1 of the auxiliary communication passage 185, flows from the control chamber to the suction chamber in the entire control region, and the flow of the refrigerant gas is not restricted until the valve element 181 passes the position of the stroke Lm in the control region and approaches the maximum stroke L. Therefore, a decrease in the operating efficiency of the variable capacity compressor is unavoidable while the control is being performed.

CITATION LIST

Patent Document

Patent Document 1: JP 5167121 B

SUMMARY OF THE INVENTION

Problem to be Solved by the Invention

In order to address the problem with the conventional art described above, the present invention provides a capacity control valve having an auxiliary communication passage to be improved in the function for discharging a liquefied refrigerant from a control chamber when a variable capacity compressor is started, the capacity control valve also shortening the start-up time for the variable capacity compressor and improving both the operating efficiency and the control responsiveness when control is being performed.

Means for Solving Problem

In order to address the problem described above, a capacity control valve of the present invention is a capacity control valve controlling, in accordance with a degree of opening of a valve portion, a flow rate or a pressure inside an operation control chamber.

The capacity control valve includes a valve body, a pressure-sensitive element, a valve element, a solenoid portion, and a throttle valve portion.

The valve body has a first valve chamber, a second valve chamber, and a third valve chamber, the first valve chamber communicating with a first communication passage, through which a fluid under a control chamber pressure passes, and having a first valve seat face and a second valve seat face, the second valve chamber having a first valve hole, which communicates with the first communication passage, and communicating with a second communication passage, through which a fluid under a discharge chamber pressure passes, and the third valve chamber communicate with a third communication passage, through which a fluid under a suction chamber pressure passes.

The pressure-sensitive element is disposed in the third valve chamber, extending and contracting in reaction to the suction chamber pressure and having a third valve seat face disposed on an extending and contracting free end.

The valve element has an intermediate communication passage, a second valve portion, a first valve portion, and a third valve portion, the intermediate communication passage allowing the first valve chamber and the third valve chamber to communicate with one another through an auxiliary communication passage, the second valve portion opening and closing the first valve hole by separating from and coming into contact with the second valve seat face, the first valve hole allowing the first valve chamber and the second valve chamber to communicate with one another, the first valve portion opening and closing the auxiliary communication passage by moving in conjunction with and in the opposite direction from the second valve portion, and the third valve portion opening and closing the intermediate communication passage and the third valve chamber by separating from and coming into contact with the third valve seat face.

The solenoid portion is attached to the valve body and has an electromagnetic coil portion, a plunger, a stator core, and a rod connecting the plunger to the valve element, the solenoid portion operating to open and close the individual valve portions of the valve element in accordance with an electric current flowing through the electromagnetic coil portion.

The throttle valve portion has a communication hole, disposed between the second valve portion and the third valve portion and allowing the intermediate communication passage and the third valve chamber to communicate with one another, and a second valve hole, disposed between the second valve chamber and the third valve chamber.

An amount of narrowing of the throttle valve portion in relation to a stroke of the valve element is large during an initial valve opening, when the second valve portion separates from the second valve seat face, and becomes smaller after the initial valve opening.

According to this aspect, when the variable capacity compressor operates to discharge the liquefied refrigerant, the liquefied refrigerant is discharged to the suction chamber through the third valve portion and the communication hole, both of which communicate with the intermediate communication passage, making it possible for the liquefied refrigerant to be discharged in a short period of time. When the discharging of the liquefied refrigerant has been completed, the control chamber pressure and the suction chamber pressure decrease, the third valve portion closes, and the second valve portion starts to open, shifting the variable capacity compressor to control operation. At this time, the throttle valve portion significantly narrows the communication hole, so the flow of a refrigerant gas through the communication hole from the control chamber to the suction chamber is greatly throttled, making it possible to prevent a deterioration in the operating efficiency of the variable capacity compressor.

In the capacity control valve of the present invention, the valve body is provided with an induction hole making the third valve chamber and the solenoid portion communicate with one another to regulate the sensitivity of the control chamber pressure to changes in the suction chamber pressure.

According to this aspect, even if the suction chamber pressure of the variable capacity compressor deviates from a set pressure, the suction chamber pressure can be made to revert quickly to the set pressure.

In the capacity control valve of the present invention, a gap portion between the rod and the stator core of the solenoid portion is provided with a clearance seal portion regulating the sensitivity of the control chamber pressure to changes in the suction chamber pressure.

According to this aspect, the sensitivity of the control chamber pressure to changes in the suction chamber pressure can be adjusted by regulating the clearance seal portion, making it possible to match the capacity control valve to the properties of the variable capacity compressor.

In the capacity control valve of the present invention, a gap portion between the valve element and the stator core of the solenoid portion is provided with a clearance seal portion regulating the sensitivity of the control chamber pressure to changes in the suction chamber pressure.

According to this aspect, the sensitivity of the control chamber pressure to changes in the suction chamber pressure can be adjusted by regulating the clearance seal portion, making it possible to match the capacity control valve to the properties of the variable capacity compressor.

A capacity control valve of the present invention is a capacity control valve controlling, in accordance with a degree of opening of a valve portion, one of a flow rate and a pressure inside an operation control chamber.

The capacity control valve includes a valve body, a pressure-sensitive element, a valve element, a solenoid portion, and a throttle valve portion.

The valve body has a first valve chamber, a second valve chamber, and a third valve chamber, the first valve chamber communicating with a first communication passage, through which a fluid under a discharge chamber pressure passes, and having a second valve seat face, the second valve chamber having a first valve hole, which communicates with the first communication passage, and communicating with a second communication passage, through which a fluid under a control chamber pressure passes, and the third valve chamber communicating with a third communication passage, through which a fluid under a suction chamber pressure passes.

The pressure-sensitive element is disposed in the third valve chamber, extending and contracting in reaction to the suction chamber pressure and having a third valve seat face disposed on an extending and contracting free end.

The valve element has a second valve portion, an intermediate communication passage, and a third valve portion, the second valve portion opening and closing the first valve hole by separating from and coming into contact with the second valve seat face, the first valve hole allowing the first valve chamber and the second valve chamber to communicate with one another, the intermediate communication passage allowing the second valve chamber and the third valve chamber to communicate with one another through an auxiliary communication passage, and the third valve portion opening and closing the third valve seat face, which allows the intermediate communication passage and the third valve chamber to communicate with one another.

The solenoid portion is attached to the valve body and has an electromagnetic coil portion, a plunger, a stator core, and a rod connecting the plunger to the valve element, the solenoid portion operating to open and close the individual valve portions of the valve element in accordance with an electric current flowing through the electromagnetic coil portion.

The throttle valve portion has a communication hole, disposed between the second valve portion and the third valve portion and allowing the intermediate communication passage and the third valve chamber to communicate with one another, and a second valve hole, disposed between the second valve chamber and the third valve chamber.

An amount of narrowing of the throttle valve portion in relation to a stroke of the valve element is large during an initial valve opening, when the second valve portion separates from the second valve seat face, and becomes smaller after the initial valve opening.

According to this aspect, when the variable capacity compressor operates to discharge the liquefied refrigerant, the liquefied refrigerant is discharged to the suction chamber through the third valve portion and the communication hole, both of which communicate with the intermediate communication passage, making it possible for the liquefied refrigerant to be discharged in a short period of time. When the discharging of the liquefied refrigerant has been completed, the control chamber pressure and the suction chamber pressure decrease, the third valve portion closes, and the second valve portion starts to open, shifting the variable capacity compressor to control operation. At this time, the throttle valve portion significantly narrows the communication hole, so a refrigerant gas through the communication hole from the control chamber to the suction chamber is greatly throttled, making it possible to prevent a deterioration in the operating efficiency of the variable capacity compressor.

In the capacity control valve of the present invention, the valve body is provided with an induction hole making the third valve chamber and the solenoid portion communicate with one another to regulate the sensitivity of the control chamber pressure to changes in the suction chamber pressure.

According to this aspect, the suction chamber pressure of the variable capacity compressor can be made to revert quickly to a set suction chamber pressure.

In the capacity control valve of the present invention, a gap portion between the rod and the stator core of the solenoid portion is provided with a clearance seal portion regulating the sensitivity of the control chamber pressure to changes in the suction chamber pressure.

According to this aspect, the sensitivity of the control chamber pressure to changes in the suction chamber pressure can be adjusted by regulating the clearance seal portion, making it possible to match the capacity control valve to the properties of the variable capacity compressor.

In the capacity control valve of the present invention, a gap portion between the valve element and the stator core of the solenoid portion is provided with a clearance seal portion regulating the sensitivity of the control chamber pressure to changes in the suction chamber pressure.

According to this aspect, the sensitivity of the control chamber pressure to changes in the suction chamber pressure can be adjusted by regulating the clearance seal portion, making it possible to match the capacity control valve to the properties of the variable capacity compressor.

BRIEF DESCRIPTION OF THE DRAWINGS

FIG. 2 is an enlarged view of a Pc-Ps flow path in FIG. 1, showing open and closed states of valve portions of a valve element in various circumstances.

DESCRIPTION OF EMBODIMENTS

Hereinafter, forms of the present invention will be explained with reference to the drawings, as exemplified by embodiments. However, the dimensions, materials, shapes, relative positions, and the like of the components described in the embodiments are not intended to serve as limits on the present invention unless otherwise explicitly described.

First Embodiment

Figure 1:
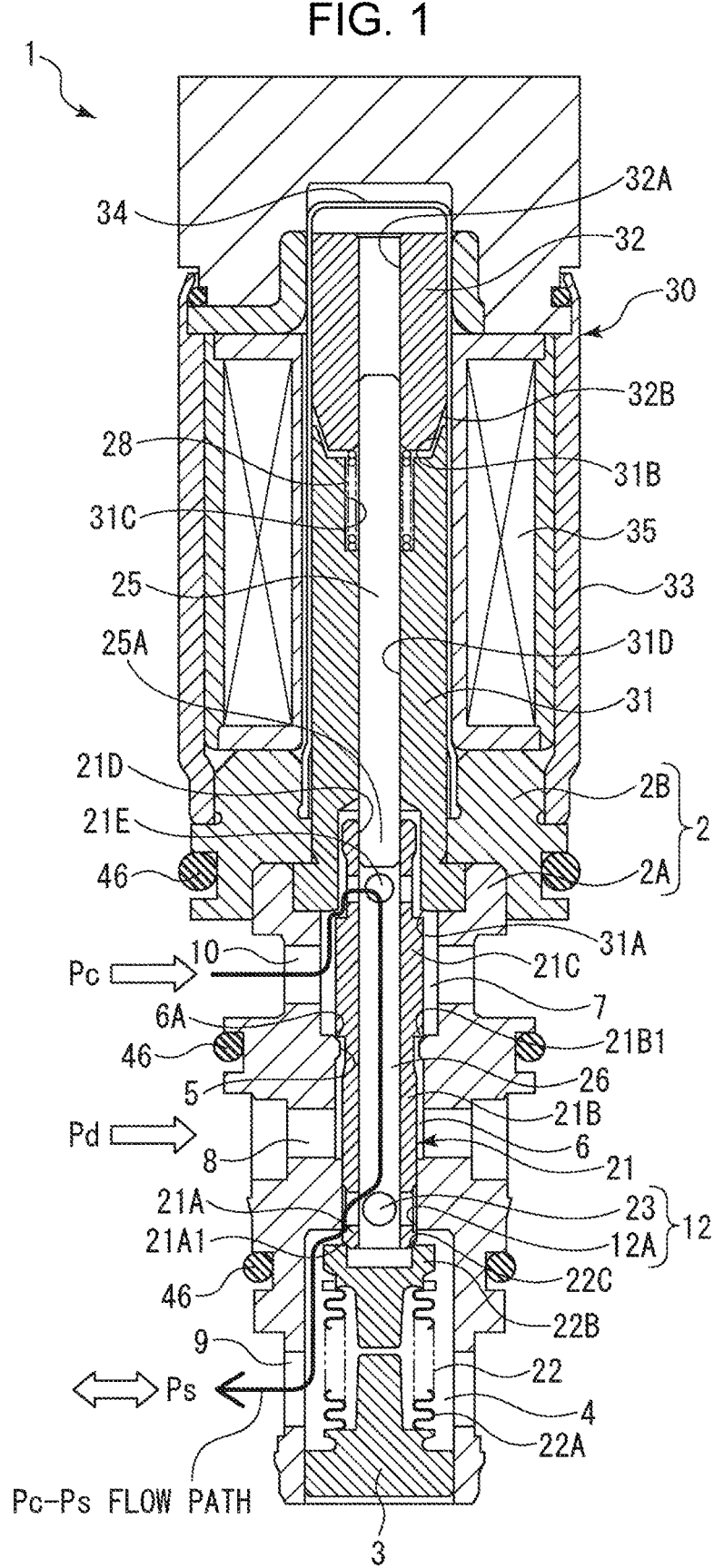
FIG. 1 is a front section view showing a capacity control valve according to a first embodiment of the present invention.

A capacity control valve according to a first embodiment of the present invention will be explained with reference to FIGS. 1 to 3. In FIG. 1, the reference numeral 1 refers to the capacity control valve. The capacity control valve 1 mainly includes a valve body 2, a valve element 21, a pressure-sensitive element 22, and a solenoid portion 30. Hereinafter, the components of the capacity control valve 1 will be explained individually.

The valve body 2 includes a first valve body 2A and a second valve body 2B, the first valve body 2A having a functioning through-hole in its interior and the second valve body 2B integrally fitted to one end of the first valve body 2A. The first valve body 2A may be composed of a metal such as brass, iron, aluminum, stainless steel, or the like, or from a synthetic resin or the like. Meanwhile, the second valve body 2B, because it functions as a magnetic path for the solenoid portion 30, is composed of a magnetic material with low magnetic reluctance, such as iron or the like. Because it differs from the first valve body 2A in both its material and function, the second valve body 2B is provided as a separate component from the first valve body 2A. As long as this point is taken into consideration, the shape of the second valve body 2B shown in FIG. 1 may be modified as desired.

The first valve body 2A is a hollow cylindrical member having a through-hole extending through it in the axial direction, with a third valve chamber 4, a second valve chamber 6, and a first valve chamber 7 being continuously provided in sections of the through-hole. Specifically, the third valve chamber 4 is formed in a section at one end of the through-hole, the second valve chamber 6 is continuously provided adjacent to the third valve chamber 4 on the side of the solenoid portion 30 of the third valve chamber 4, and the first valve chamber 7 is continuously provided adjacent to the second valve chamber 6 on the side of the solenoid portion 30 of the second valve chamber 6. In addition, a second valve hole 12A is continuously provided between the third valve chamber 4 and the second valve chamber 6, its diameter being smaller than the diameters of the second and third valve chambers. Furthermore, a first valve hole 5 is continuously provided between the second valve chamber 6 and the first valve chamber 7, its diameter being smaller than the diameters of the second and first valve chambers, and a second valve seat face 6A is provided around the first valve hole 5 on the side of the first valve chamber 7.

Third communication passages 9 are connected to the third valve chamber 4. The third communication passages 9 communicate with a suction chamber of a variable capacity compressor (not shown) and are configured such that the capacity control valve 1 can cause a fluid under a suction chamber pressure Ps to flow into and out of the third valve chamber 4.

Second communication passages 8 are connected to the second valve chamber 6. The second communication passages 8 communicate with a discharge chamber of the variable capacity compressor and are configured such that the capacity control valve 1 can allow a volume of a fluid under a discharge chamber pressure Pd to flow into a control chamber.

First communication passages 10 are formed in the first valve chamber 7. The first communication passages 10 communicate with the control chamber (the crank chamber) of the variable capacity compressor and allow the fluid that has flowed in from the second valve chamber 6 under the discharge chamber pressure Pd to flow out to the control chamber (the crank chamber) of the variable capacity compressor, as will be described later.

Note that the first communication passages 10, the second communication passages 8, and the third communication passages 9 each extend through the periphery of the valve body 2 at from two to six equally distributed points. Further, the outer periphery of the valve body 2 is formed into four stepped sections, and mounting grooves for O-rings are provided in the outer periphery at three locations that are set apart from one another in the axial direction. An O-ring 46 is provided in each one of the mounting grooves to seal the gap between the valve body 2 and mounting holes of a casing (not shown) that is fitted onto the valve body 2, thereby providing a configuration in which the flow paths of the first communication passages 10, the second communication passages 8, and the third communication passages 9 are mutually independent.

The pressure-sensitive element 22 is provided inside the third valve chamber 4. One end of a metal bellows 22A of the pressure-sensitive element 22 is tightly joined to a partition adjustment portion 3. The bellows 22A may be made of phosphor bronze or the like, and it is designed to have a spring constant of s specified value. The space inside the pressure-sensitive element 22 may be one of a vacuum and a space filled with air. The pressure-sensitive element 22 is configured such that it contracts when a pressure inside the third valve chamber 4 (for example, a pressure Pc) and the suction chamber pressure Ps act on an effective pressure-receiving area $S_{BL}$ of the bellows 22A of the pressure-sensitive element 22. A valve seat portion 22B is provided on the free end of the pressure-sensitive element 22, the valve seat portion 22B being dish-shaped and having a third valve seat face 22C around the inner periphery of its end portion.

The partition adjustment portion 3 of the pressure-sensitive element 22 is fitted such that it seals off the third valve chamber 4 of the first valve body 2A. Note that the spring force of the bellows 22A or of a compression spring that is disposed inside and parallel to the bellows 22A can be adjusted in the axial direction by tightening a set screw (not shown).

Next, the valve element 21 will be explained. The valve element 21 is a hollow cylindrical member having an intermediate communication passage 26 extending through it in the axial direction, with a third valve portion 21A, a second valve portion 21B, and a first valve portion 21C being continuously provided, and having auxiliary communication passages 21E and communication holes 23 communicating with the intermediate communication passage 26. The valve element 21 is provided such that it moves freely in the axial direction within the through-hole of the first valve body 2A.

A third valve portion face 21A1 is provided on one end of the valve element 21. By separating from and coming into contact with the third valve seat face 22C of the pressure-sensitive element 22, the third valve portion face 21A1 opens and closes the intermediate communication passage 26 and the third valve chamber 4. When the third valve portion face 21A1 and the third valve seat face 22C change from a state of contact to a state of separation, the third valve portion 21A opens, and when the third valve portion face 21A1 and the third valve seat face 22C change from a state of separation to a state of contact, the third valve portion 21A closes.

The second valve portion 21B of the valve element 21 is provided on the opposite side of the third valve portion 21A from the third valve portion face 21A1. The second valve portion 21B at an intermediate portion of the valve element 21 is disposed in the second valve chamber 6. A second valve portion face 21B1 that comes into contact with the second valve seat face 6A is provided in the second valve portion 21B, and the outside diameter of the second valve portion 21B is formed to be smaller than the diameter of the first valve hole 5. When the second valve portion face 21B1 and the second valve seat face 6A change from a state of contact to a state of separation, the second valve portion 21B opens, such that the second valve chamber 6 communicates with the first valve chamber 7, enabling a fluid under the discharge chamber pressure Pd to flow. Conversely, when the second valve portion face 21B1 and the second valve seat face 6A change from a state of separation to a state of contact, the second valve portion 21B closes, such that the second valve chamber 6 and the first valve chamber 7 are cut off from one another and the flow of the fluid under the discharge chamber pressure Pd is closed off. Hereinafter, the flow path from the second communication passages 8, the second valve chamber 6, and the first valve hole 5, which communicate with the discharge chamber, through the second valve portion 21B, to the first valve chamber 7 and the first communication passages 10, which communicate with the control chamber, will be called the Pd-Pc flow path. That is, the Pd-Pc flow path from the second communication passages 8 to the first communication passages 10 is opened and closed off by the opening and closing of the second valve portion 21B.

A linking portion 25A of the valve element 21 provided on the lower end of a solenoid rod 25 is fitted into a fitting portion 21D of the valve element 21. The first valve portion 21C is provided between the fitting portion 21D and the second valve portion 21B and is disposed inside the first valve chamber 7. The auxiliary communication passages 21E are provided at four equally distributed positions, for example, inside the first valve chamber 7, directly below the fitting portion 21D. The first valve chamber 7 communicates with the intermediate communication passage 26 through the auxiliary communication passages 21E. Note that the first valve chamber 7 is configured such that it has a face with a substantially larger diameter than the outside diameter of the first valve portion 21C, enabling fluid under a control chamber pressure Pc to flow readily into the first valve chamber 7 from the first communication passages 10.

A first valve seat face 31A is formed on the lower end face of a stator core 31 of the solenoid portion 30. When the first valve portion 21C and the first valve seat face 31A change from a state of contact to a state of separation, the first valve portion 21C opens, such that the fluid under the control chamber pressure Pc flows out from the first communication passages 10 and the first valve chamber 7, through the auxiliary communication passages 21E, the intermediate communication passage 26, and a throttle valve portion 12, to the third valve chamber 4 and the third communication passages 9. Conversely, when the first valve portion 21C and the first valve seat face 31A change from a state of separation to a state of contact, the first valve portion 21C closes, such that the flow of the fluid under the control chamber pressure Pc from the first communication passages 10 and the first valve chamber 7, through the auxiliary communication passages 21E, the intermediate communication passage 26, and the throttle valve portion 12, to the third valve chamber 4 and the third communication passages 9 is closed off. Hereinafter, the flow path from the first communication passages 10 and the first valve chamber 7, which communicate with the control chamber, through the first valve portion 21C, the auxiliary communication passages 21E, the intermediate communication passage 26, and the throttle valve portion 12, to the third valve chamber 4, which communicates with the suction chamber, will be called the Pc-Ps flow path. That is, the Pc-Ps flow path from the first communication passages 10 to the third communication passages 9 is opened and closed off by the opening and closing of the first valve portion 21C.

At least one of the communication holes 23, which communicates with the intermediate communication passage 26, is provided between the third valve portion 21A and the second valve portion 21B, and the communication holes 23 function as the throttle valve portion 12 by sliding in relation to the second valve hole 12A. The communication holes 23 of the throttle valve portion 12, by moving in the axial direction in relation to the second valve hole 12A, move forward and backward within the third valve chamber 4, such that the opening area of the communication holes 23 changes from a fully open state to a fully closed state in relation to the third valve chamber 4.

Next, the solenoid portion 30 will be explained. The solenoid portion 30 is configured such that the solenoid rod 25, a plunger case 34, an electromagnetic coil 35, the stator core 31, a plunger 32, and spring means 28 are contained in a solenoid case 33. The stator core 31, to which the second valve body 2B is fixed, is provided between the valve element 21 and the plunger 32. The solenoid rod 25 is fitted into a through-hole 31D of the stator core 31 such that it can move freely, with the linking portion 25A of the solenoid rod 25 being fitted into the fitting portion 21D of the valve element 21, and the opposite end of the solenoid rod 25 being fitted into a fitting hole 32A of the plunger 32.

The plunger case 34 is a hollow cylindrical member that is open at one end and closed at the other end. It is fitted into the inside diameter portion of the electromagnetic coil 35, its open end being fitted into a fitting hole of the second valve body 2B such that it is tightly sealed, and its closed end being fixed in a fitting hole in an end portion of the solenoid case 33.

The electromagnetic coil 35 is thus tightly sealed by the plunger case 34, the second valve body 2B, and the solenoid case 33, and any decrease in its insulation resistance can be prevented, because it does not come into contact with the refrigerant.

The stator core 31 and the plunger 32 are provided inside the plunger case 34, and the plunger 32 is fitted into the plunger case 34 such that it moves freely. A spring seat chamber 31C is formed close to the end of the stator core 31 that faces the plunger 32. The spring means (hereinafter, also called the elastic means) 28, which changes the first valve portion 21C and the second valve portion 21B from a closed state to an open state, is disposed in the spring seat chamber 31C. Specifically, the spring means 28 acts so as to keep the plunger 32 apart from the stator core 31. An adsorption face 31B to stator core 31 and a joining face 32B of the plunger 32 are tapered faces that are opposite one another, and they are disposed such that a gap is provided between the opposing faces.

The separation and contact of the adsorption face 31B of the stator core 31 and the joining face 32B of the plunger 32 is performed in accordance with the strength of the electric current flowing through the electromagnetic coil 35. Specifically, in a state in which current is not flowing through the electromagnetic coil 35, the repelling force of the spring means 28 forms the maximum gap between the adsorption face 31B of the stator core 31 and the joining face 32B of the plunger 32, such that the first valve portion 21C and the throttle valve portion 12 close, and the second valve portion 21B opens. In contrast, in a state in which current is flowing through the electromagnetic coil 35, the magnetic attractive force attracts the joining face 32B of the plunger 32 to the adsorption face 31B of the stator core 31, such that the first valve portion 21C and the throttle valve portion 12 open, and the second valve portion 21B closes. The magnitude of the electric current that is supplied to the electromagnetic coil 35 is controlled by a control portion (not shown), in accordance with the open and closed states of the valve portions of the valve element 21.

The operation of the capacity control valve 1 having the configuration explained above will be explained. In a case where the variable capacity compressor is stopped and then restarted after being left inoperative for a long period of time, a state is created in which liquefied refrigerant (refrigerant gas that has been liquefied by cooling while the compressor is inoperative) has accumulated in the control chamber (the crank chamber). Therefore, the pressure in the control chamber cannot be freely controlled by the capacity control valve 1, so the refrigerant gas cannot be reliably compressed, and the pre-set discharge rate cannot be ensured. Accordingly, in order to perform the desired capacity control immediately after the compressor is restarted, the capacity control valve 1 of the present invention discharges the liquefied refrigerant from the control chamber (the crank chamber) as quickly as possible, such that the refrigerant is vaporized.

The operating states of the first valve portion 21C, the second valve portion 21B, the third valve portion 21A, and the throttle valve portion 12 will be explained with reference to FIGS. 1 and 2. Note that in FIGS. 1 and 2(a), the solid line arrow from the first communication passages 10 to the third communication passages 9 indicates the Pc-Ps flow path.

During the liquefied refrigerant discharge shown in FIG. 2(a) (during maximum capacity control), that is, with the second valve portion 21B in a fully closed state, the first valve portion 21C in a fully open state, and the throttle valve portion 12 in a fully open state, the fluid under the control chamber pressure Pc (the fluid under the control chamber pressure PC being the refrigerant liquid that has vaporized during the liquefied refrigerant discharge) flows into the third valve chamber 4 through the auxiliary communication passages 21E, the intermediate communication passage 26, and the communication holes 23 of the throttle valve portion 12, then flows out of the third valve chamber 4 to the third communication passages 9.

In the state in FIG. 2(a), the communication holes 23 of the throttle valve portion 12 produce a maximum opening area S2max in relation to the second valve hole 12A. Here, the positions and shapes of the communication holes 23 are set such that the maximum opening area S2max is not greater than the minimum opening area among areas of the first valve portion 21C, the intermediate communication passage 26, and the auxiliary communication passages 21E (the total opening area where a plurality of the auxiliary communication passages are provided). That is, the throttle valve portion 12 is a bottleneck in the Pc-Ps flow path.

Next, when the discharge of the liquefied refrigerant has been completed and operation shifts into a control region, as shown in FIG. 2(b), the control chamber pressure and the suction chamber pressure decrease, such that the pressure-sensitive element 22 extends and the third valve portion 21A closes. The solenoid portion 30 is controlled such that the second valve portion 21B starts moving from a fully closed state to a fully open state, and the throttle valve portion 12 starts moving from a fully open state toward a closed state. This narrows down the throttle valve portion 12, which is a bottleneck, so the Pc-Ps flow path is narrowed at the same time that the second valve portion face 21B1 of the second valve portion 21B separates from the second valve seat face 6A. Furthermore, the amount of the narrowing of the throttle valve portion 12 in relation to the stroke of the valve element 21 is set such that it is large when the second valve portion face 21B1 of the second valve portion 21B first separates from the second valve seat face 6A and the second valve portion 21B initially opens, and then becomes less after the initial opening of the valve.

Next, when the solenoid portion 30 is turned off, as shown in FIG. 2(c), the valve element 21 moves such that the second valve portion 21B enters a fully open state, the first valve portion 21C enters a fully closed state, the throttle valve portion 12 enters a fully closed state, and the Pc-Ps flow path is closed off.

Figure 3:
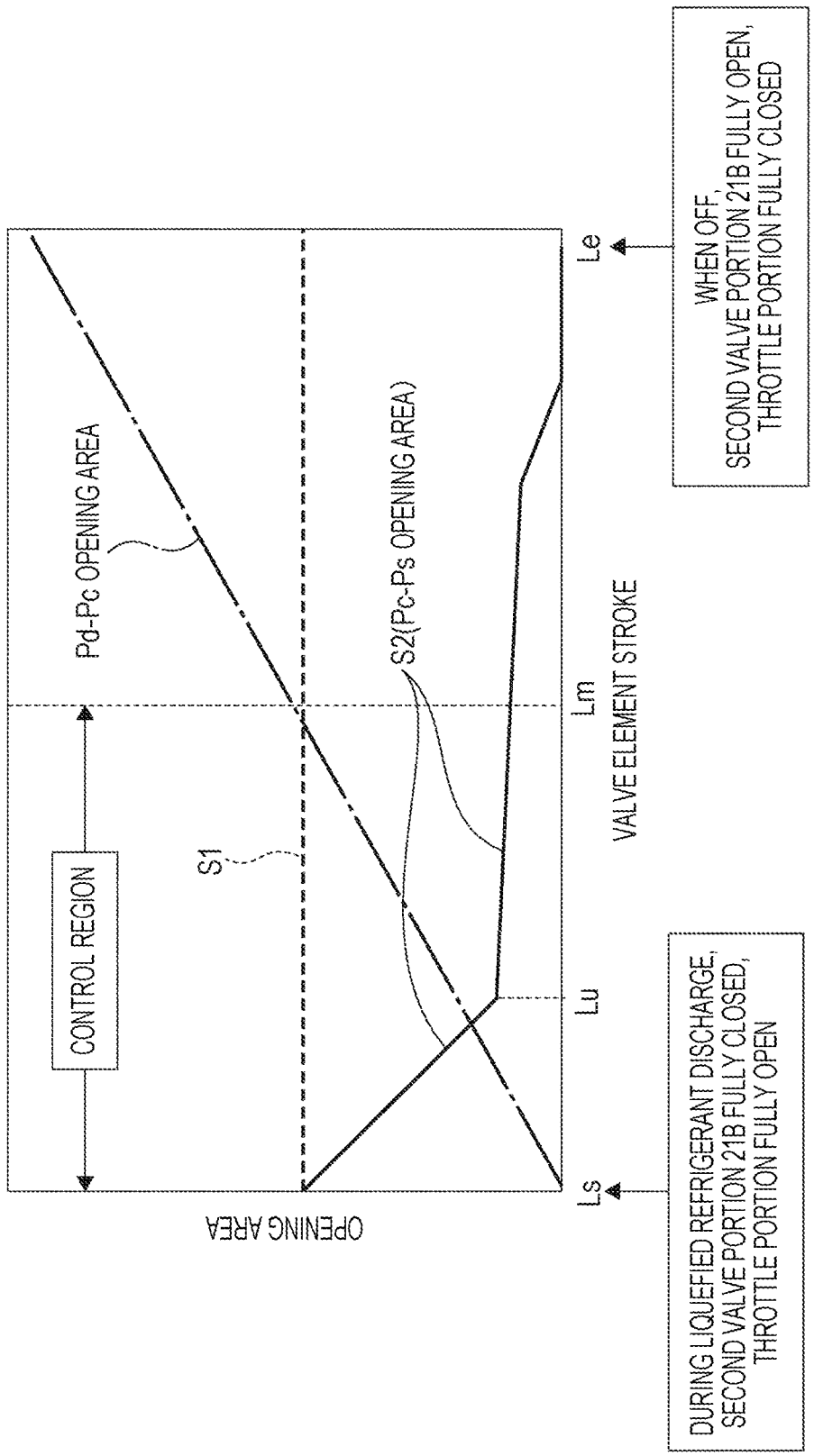
FIG. 3 is a figure showing relationships between a stroke of the valve element and opening areas of the Pc-Ps flow path and a Pd-Pc flow path of the capacity control valve according to the first embodiment.

Here, the relationship between the amount of the narrowing of the throttle valve portion 12 and the stroke of the valve element 21, as shown in FIG. 3, will be explained. The horizontal axis in FIG. 3 indicates the stroke of the valve element 21, and the vertical axis indicates the opening area. The stroke Ls in FIG. 3 corresponds to the discharging of the liquefied refrigerant shown in FIG. 2(a), a state when the second valve portion 21B is fully closed (and the first valve portion 21C is fully open). In the same manner, the stroke Le indicates the state in FIG. 2(c), when the second valve portion 21B is fully open (and the first valve portion 21C is fully closed). The interval (Ls-Lm) on the horizontal axis in FIG. 3 is the stroke range that indicates the control region. Note also that the horizontal broken line located approximately at the midpoint of the vertical axis indicates a smallest opening area S1 among areas of the first valve portion 21C, the auxiliary communication passages 21E, and the intermediate communication passage 26 in the Pc-Ps flow path.

In the present invention, an opening area S2 of the throttle valve portion 12 is set to be less than the area S1 in the control region, creating a bottleneck in the Pc-Ps flow path. Thus, in the capacity control valve that is provided with the auxiliary communication passages 21E in the first valve portion 21C in the first valve chamber 7, on which the fluid under the control chamber pressure acts, and is provided with the pressure-sensitive element 22 and the third valve portion 21A, which discharges the liquefied refrigerant, in the third valve chamber 4, on which the fluid under the suction chamber pressure acts, the minimum opening area of the Pc-Ps flow path in the control region is set by the throttle valve portion 12, a simple component made up of the communication holes 23, which are provided between the second valve portion 21B and the third valve portion 21A, and the second valve hole 12A, which is provided between the second communication passages 8 and the third communication passages 9.

In FIG. 3, the opening area S2 of the throttle valve portion 12 in the control region is indicated by a solid line. At the left end of the line, during the discharging of the liquefied refrigerant, that is, in the state when the second valve portion 21B is fully closed (and the first valve portion 21C is fully open), the throttle valve portion 12 is in a state where it produces the maximum opening area S2max, and the maximum opening area S2max is set to be the same or nearly the same as the area S1 of the auxiliary communication passages 21E (refer to FIG. 2(a)).

Next, when the discharge of the liquefied refrigerant has been completed and operation shifts into the control region, the control chamber pressure and the suction chamber pressure decrease, such that the pressure-sensitive element 22 extends and the third valve portion 21A closes. The solenoid portion 30 is controlled such that the second valve portion 21B starts moving from a fully closed state to a fully open state, and the throttle valve portion 12 starts moving from a fully open state toward a closed state. This narrows down the throttle valve portion 12, which is a bottleneck, so the Pc-Ps flow path is narrowed at the same time that the second valve portion face 21B1 of the second valve portion 21B separates from the second valve seat face 6A. Furthermore, the amount of the narrowing of the throttle valve portion 12 in relation to the stroke of the valve element 21 is set such that it is large when the second valve portion face 21B1 of the second valve portion 21B first separates from the second valve seat face 6A and the second valve portion 21B initially opens (between Ls and Lu in FIG. 3), and then becomes less after the initial opening of the valve (between Lu and Le in FIG. 3). It is therefore possible to narrow the Pc-Ps flow path rapidly. Because the amount of the refrigerant that flows through the Pc-Ps flow path during control of the variable capacity compressor can thus be decreased rapidly, it is possible to prevent a decrease in the efficiency of the variable capacity compressor.

The amount of the narrowing of the throttle valve portion 12 in relation to the stroke of the valve element 21 is the narrowing rate of the throttle valve portion 12, and it is indicated by the slope of the opening area S2 line in FIG. 3. The narrowing rate of the throttle valve portion 12 is set such that it is large when the second valve portion face 21B1 of the second valve portion 21B first separates from the second valve seat face 6A and the second valve portion 21B initially opens (between Ls and Lu in FIG. 3), and then becomes less after the initial opening of the valve (between Lu and Le in FIG. 3). Specifically, during the initial valve opening, when the second valve portion 21B separates from the second valve seat face 6A (between Ls and Lu), the opening of the second valve portion 21B changes from 0% to 30%, and the opening of the throttle valve portion 12 is rapidly narrowed from 100% to around 10% to 30%. After the initial valve opening (between Lu and Le), the opening of the second valve portion 21B changes from 30% to 100%, and the opening of the throttle valve portion 12 is gradually narrowed from around 10% to 30% down to a fully closed state of 0%.

Note that the opening area S2 of the throttle valve portion 12 in relation to the stroke of the valve element 21 varies according to the relative positions of the communication holes 23 and the second valve hole 12A, and can be varied in a non-linear manner according to the shape of the communication holes 23, as shown in FIG. 3. In the example in FIGS. 1 and 2, the shape of the communication holes 23 in a front view is substantially circular, while the cross-sectional shape is a stepped shape (refer to FIG. 2(c)) composed of a large diameter portion 23a on the side facing the second valve hole 12A and a small diameter portion 23b on the side facing the intermediate communication passage 26. The large diameter portion 23a is closed at one end and has a specified depth. The small diameter portion 23b is formed with a smaller diameter than the large diameter portion 23a and extends through the valve element 21. Thus, during the initial movement of the valve element 21, the large diameter portion 23a overlaps almost entirely with the second valve hole 12A, and the gap between the two decreases rapidly. Thereafter, a gap remains between the communication hole 23 and the second valve hole 12A in the radial direction, so the opening area changes as indicated by the solid line in FIG. 3.

The shape of the communication hole 23 in a front view is not limited to being substantially circular. For example, the communication hole 23 may have a horizontal opening portion provided on the side of the second valve portion 21B, extending in a direction orthogonal to the valve axis, and an axial direction opening portion provided on the side of the third valve portion 21A, extending in the axial direction, with the horizontal opening portion being located above the axial direction opening portion to form a substantially T-shaped opening portion. Thus, during the initial opening of the valve element 21, when the second valve portion face 21B1 of the second valve portion 21B separates from the second valve seat face 6A, the horizontal opening portion of the communication hole 23 overlaps with the second valve hole 12A, and the horizontal opening portion is narrowed rapidly. Thereafter, the axial direction opening portion of the communication hole 23 overlaps with the second valve hole 12A, and the axial direction opening portion is narrowed gradually, thereby making it possible to change the opening area as indicated by the solid line in FIG. 3.

Furthermore, the shape of the communication hole 23 may also be an inverted triangular shape, with the apex disposed on the side of the third valve portion 21A and the base disposed on the side of the second valve portion 21B in a front view. Thus, when the valve element 21 starts to move, the communication holes 23 of the throttle valve portion 12 are closed off by the second valve hole 12A, starting from the base side of the triangle, thereby making it possible to change the opening area as indicated by the solid line in FIG. 3. The shape of the communication hole 23 may thus be a circle, an ellipse, an inverted triangle, a trapezoid, a pentagon, or the like. The essential point is that the shape be such that the greater part of the opening area is closed off in the region where the valve element 21 initially moves after the liquefied refrigerant has been discharged, and that the lesser part of the opening area is thereafter closed off gradually. That makes it possible to change the opening area of the throttle valve portion 12 in relation to the stroke of the valve element 21 in a non-linear manner.

The capacity control valve according to the first embodiment of the present invention, described above, achieves the significant effects hereinafter described.

When the variable capacity compressor operates to discharge the liquefied refrigerant, the liquefied refrigerant is discharged to the suction chamber from the third valve portion 21A and the communication holes 23, both of which communicate with the intermediate communication passage 26, making it possible for the liquefied refrigerant to be discharged in a short period of time. After the discharging of the liquefied refrigerant is completed, the third valve portion 21A closes, and the second valve portion 21B starts to open, shifting the variable capacity compressor to control operation. At this time, the throttle valve portion 12 is significantly narrowed, so the flow of refrigerant gas from the control chamber to the suction chamber can be decreased rapidly, making it possible to improve the operating efficiency of the variable capacity compressor throughout the entire control region.

The opening area S2 of the throttle valve portion 12 is set to be smaller than the area S1 of the auxiliary communication passages 21E. Thus, in the capacity control valve in which the function of discharging the liquefied refrigerant from the control chamber when the variable capacity compressor is started is improved by the providing of the auxiliary communication passages, the minimum area of the Pc-Ps flow path can be made smaller in the control region. In turn, that makes it possible to shorten the starting time of the variable capacity compressor, while also improving its efficiency during control operation.

Second Embodiment

A capacity control valve according to a second embodiment of the present invention will be explained with reference to FIG. 4. The capacity control valve 50 according to the second embodiment mainly differs from the capacity control valve 1 of the first embodiment in that a first valve body 52A is provided with an induction hole 53, but the basic configuration is otherwise the same as that in the first embodiment. The same reference numerals will be used for the same members, and redundant explanations will be omitted.

A valve body 52 is composed of the first valve body 52A and the second valve body 2B, which is integrally fitted to one end of the first valve body 52A. The configuration of the second valve body 2B is the same as in the first embodiment. In contrast, the first valve body 52A is newly provided with the induction hole 53, extending from the third valve chamber 4 to a solenoid portion 200 in parallel to the through-hole that defines the third valve chamber 4, the second valve chamber 6, and the first valve chamber 7. An induction channel 201A is also formed in a stator core 201 of the solenoid portion 200, in a position that faces the induction hole 53. Furthermore, a gap portion 36 is formed between the stator core 201 and the solenoid rod 25, and a clearance seal portion 207 having a narrower gap than the gap portion 36 is formed in the gap portion 36 between the stator core 201 and the solenoid rod 25. Thus, the fluid under the suction chamber pressure Ps in the third valve chamber 4 flows through the induction hole 53 and the induction channel 201A into the gap between the stator core 201 and the plunger case 34, then flows into the gap portion 36 between the stator core 201 and the solenoid rod 25 and is sealed at the clearance seal portion 207.

Figure 4:
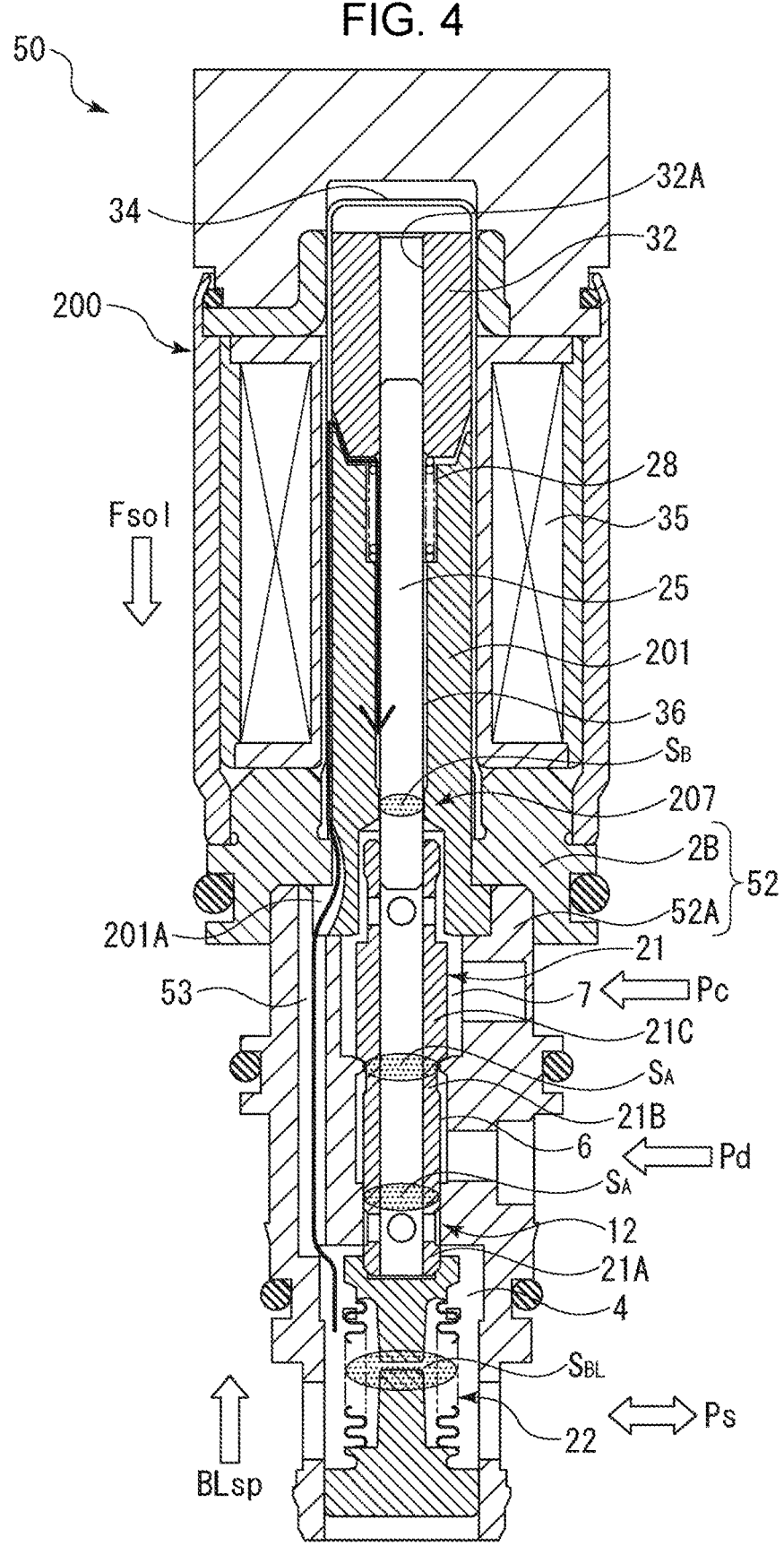
FIG. 4 is a front section view showing a capacity control valve according to a second embodiment of the present invention.

The balance of the external forces acting on the valve element 21 of the capacity control valve 50 in FIG. 4, which is provided with the induction hole 53, can be expressed by the following equation:

$$BLsp - Ps \times S_{BL} - (Pc-Ps) \times (S_A - S_B) = Fsol \qquad \text{(Equation 1)}$$

Here,
Ps: Suction chamber pressure of the variable capacity compressor
Pd: Discharge chamber pressure of the variable capacity compressor
Pc: Control chamber pressure of the variable capacity compressor
BLsp: Spring force of the pressure-sensitive element 22
$S_{BL}$: Pressure-receiving area of the pressure-sensitive element 22
$S_A$: Pressure-receiving area of the second valve portion 21B, third valve portion 21A
$S_B$: Pressure-receiving area of the clearance seal portion 207
Fsol: Driving force of the solenoid portion 200

In contrast, the balance of the external forces acting on the valve element 21 of the capacity control valve 1 in FIG. 1, which is not provided with the induction hole 53, can be expressed by the following equation:

$$BLsp - Ps \times S_{BL} - (Pc-Ps) \times S_A = Fsol \qquad \text{(Equation 2)}$$

The third term on the left side of Equation 1 ($-(Pc-Ps) \times (S_A - S_B)$) and the third term on the left side of Equation 2 ($-(Pc-Ps) \times S_A$) describe the force acting in the direction in which the second valve portion 21B is closed.

Here, comparing Equation 1 and Equation 2, the pressure-receiving area $S_A$ in Equation 2 is greater than the area $(S_A - S_B)$ in Equation 1. That is, in the capacity control valve 50 in FIG. 4, in which the pressure-receiving area ($S_A$−$S_B$) is smaller, the force acting in the direction of closing the second valve portion 21B is smaller in relation to the same differential pressure (Pc−Ps) than it is in the capacity control valve 1 in FIG. 1, in which the pressure-receiving area $S_A$ is larger, so the second valve portion 21B is more difficult to close. Accordingly, because the second valve portion 21B in the capacity control valve 50 in FIG. 4 is more difficult to close in relation to the same differential pressure (Pc−Ps), the amount of the fluid supplied from the second valve chamber 6 to the first valve chamber 7 under the discharge chamber pressure Pd increases, and the control chamber pressure Pc becomes more variable. Conversely, because the second valve portion 21B in the capacity control valve 1 in FIG. 1 is easier to close in relation to the same differential pressure (Pc−Ps), the amount of the fluid supplied from the second valve chamber 6 to the first valve chamber 7 under the discharge chamber pressure Pd decreases, so the control chamber pressure Pc becomes less variable.

Specifically, the increase in the variability of the control chamber pressure Pc in relation to the same differential pressure (Pc−Ps) occurs as herein described. When the suction chamber pressure Ps of the variable capacity compressor deviates from a set suction chamber pressure Pset, the differential pressure (Pc−Ps) changes. The control chamber pressure Pc then changes immediately in accordance with the change in the differential pressure (Pc−Ps), such that the suction chamber pressure Ps quickly reverts to the set suction chamber pressure Pset.

The capacity control valve 50 according to the second embodiment of the present invention, described above, achieves the significant effects hereinafter described.

Because the induction hole 53 is provided in the first valve body 52A, the fluid under the suction chamber pressure Ps can be introduced into the rear side of the plunger case 34 from the third valve chamber 4, making it possible not only to improve the responsiveness of the control chamber pressure Pc in relation to the suction chamber pressure Ps, but also to improve the responsiveness of the variable capacity compressor to the thermal load. Thus, the dimensions of pressure-sensitive elements, valve elements, and the like, which have conventionally been designed individually in accordance with the properties of a specific variable capacity compressor, can now be matched to individual variable capacity compressors without making major design changes.

Third Embodiment

A capacity control valve 60 according to a third embodiment of the present invention will be explained with reference to FIG. 5. The capacity control valve 60 according to the third embodiment mainly differs from the capacity control valve 50 of the second embodiment in that the fluid under the suction chamber pressure Ps that is introduced into the rear side of the plunger case 34 from the third valve chamber 4 is sealed by a clearance seal portion 208 between a stator core 202 and the valve element 21, but the basic configuration is otherwise the same as that in the second embodiment. The same reference numerals will be used for the same members, and redundant explanations will be omitted.

The first valve body 52A is the same as in the second embodiment in that the induction hole 53 is provided extending from the third valve chamber 4 to the solenoid portion 210 in parallel to the through-hole that defines the third valve chamber 4, the second valve chamber 6, and the first valve chamber 7, and that an induction channel 202A is formed in the stator core 202 of a solenoid portion 210, in a position that faces the induction hole 53. Furthermore, the clearance seal portion 208 is formed between the stator core 202 and the valve element 21, and the gap of the clearance seal portion 208 is narrower than the gap portion 36 between the stator core 202 and the solenoid rod 25. Thus, the fluid under the suction chamber pressure Ps in the third valve chamber 4 flows through the induction hole 53 and the induction channel 201A into the gap between the stator core 202 and the plunger case 34, then flows into the gap portion 36 between the stator core 202 and the solenoid rod 25 and is sealed at the clearance seal portion 208. As shown in FIG. 5, because the induction hole 53 is also provided in the first valve body 52A in the capacity control valve 60 of the third embodiment, the fluid under the suction chamber pressure Ps is introduced into the rear side of the plunger case 34 from the third valve chamber 4, but an pressure-receiving area $S_C$ of the clearance seal portion 208 is larger than the pressure-receiving area $S_B$ of the clearance seal portion 207 (FIG. 4) of the capacity control valve 50 (FIG. 4) of the second embodiment.

Figure 5:
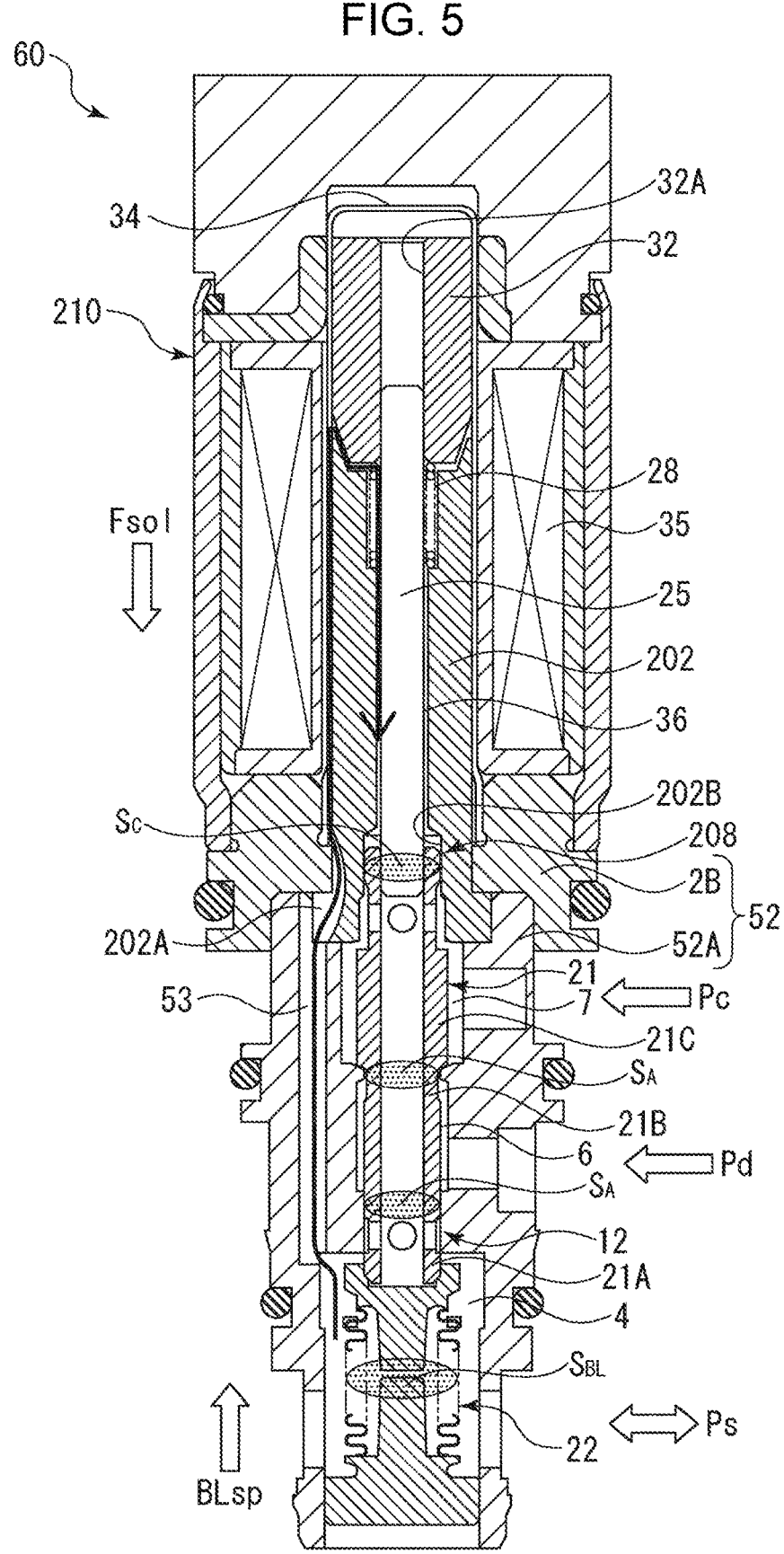
FIG. 5 is a front section view showing a capacity control valve according to a third embodiment of the present invention.

The balance of the external forces acting on the valve element 21 of the capacity control valve 60 in FIG. 5 can be expressed by the following equation:

$$BLsp - Ps \times S_{BL} - (Pc-Ps) \times (S_A - S_C) = Fsol \qquad \text{(Equation 3)}$$

Here,
Ps: Suction chamber pressure of the variable capacity compressor
Pd: Discharge chamber pressure of the variable capacity compressor
Pc: Control chamber pressure of the variable capacity compressor
BLsp: Spring force of the pressure-sensitive element 22
$S_{BL}$: Pressure-receiving area of the pressure-sensitive element 22
$S_A$: Pressure-receiving area of the second valve portion 21B, third valve portion 21A
$S_C$: Pressure-receiving area of the clearance seal portion 208
Fsol: Driving force of the solenoid portion 210

The third term on the left side of Equation 3 (−(Pc−Ps)×($S_A$−$S_C$)) according to the capacity control valve 60 of the third embodiment (FIG. 5) describes the force acting in the direction in which the second valve portion 21B is closed.

Here, the pressure-receiving area $S_C$ of the clearance seal portion 208 (FIG. 5) is set to be greater than the pressure-receiving area $S_B$ of the clearance seal portion 207 (FIG. 4), so the force (−(Pc−Ps)×($S_A$−$S_C$)) acting in the direction in which the second valve portion 21B is closed becomes smaller in the capacity control valve 60 of the present embodiment (FIG. 5). Accordingly, because the second valve portion 21B in the capacity control valve 60 is more difficult to close in relation to the same differential pressure (Pc−Ps), the amount of the fluid supplied under the discharge chamber pressure Pd from the second valve chamber 6 through the first valve chamber 7 to the control chamber of the variable capacity compressor increases, and the control chamber pressure Pc is more variable. In the capacity control valve 60 of the present embodiment, making the pressure-receiving area $S_C$ of the clearance seal portion 208, which is subject to the suction chamber pressure Ps, larger than the pressure-receiving area $S_B$ of the clearance seal portion 207 of the capacity control valve 50 makes it possible to improve even further the responsiveness of the control chamber pressure Pc to changes in the suction chamber pressure Ps.

Figure 6:
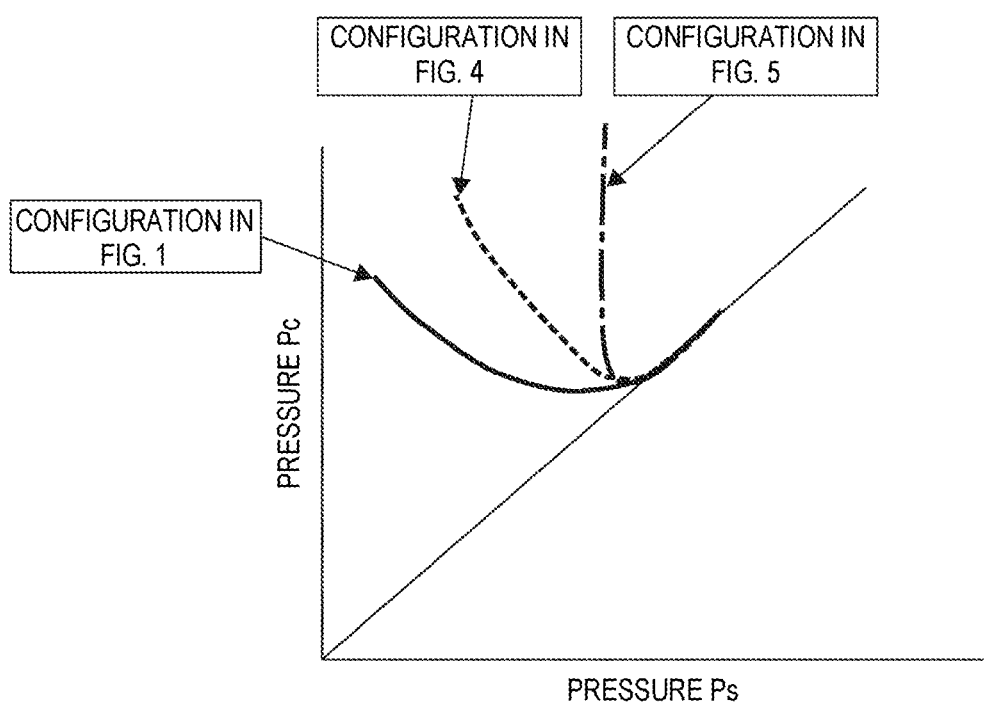
FIG. 6 is a figure showing changes in a control chamber pressure Pc in relation to a suction chamber pressure Ps in the capacity control valve 1 of the first embodiment, the capacity control valve 50 of the second embodiment, and the capacity control valve 60 of the third embodiment.

FIG. 6 is a figure showing changes in the control chamber pressure Pc in relation to the suction chamber pressure Ps in the capacity control valve 1 of the first embodiment (configuration in FIG. 1), the capacity control valve 50 of the second embodiment (configuration in FIG. 4), and the capacity control valve 60 of the third embodiment (configuration in FIG. 5). In FIG. 6, the amount of change in the control chamber pressure Pc (the control output value) in relation to that in the suction chamber pressure Ps (the control input value) is smallest in the capacity control valve 1 of the configuration in FIG. 1, then becomes successively greater in the capacity control valve 50 of the configuration in FIG. 4 and the capacity control valve 60 of the configuration in FIG. 5. Adjusting the slope of the graph of the control chamber pressure Pc in relation to the suction chamber pressure Ps, as from the configuration in FIG. 1 to the configuration in FIG. 5 shown in FIG. 6, makes it possible to adjust the change in the control chamber pressure Pc in relation to the change in the suction chamber pressure Ps, so the capacity control valve can be easily matched to the properties of individual variable capacity compressors.

The capacity control valve according to the third embodiment of the present invention, described above, achieves the significant effects hereinafter described.

Because the induction hole 53 is provided in the first valve body 52A, the fluid under the suction chamber pressure Ps can be introduced into the rear side of the plunger case 34 from the third valve chamber 4, making it possible to adjust the responsiveness of the control chamber pressure Pc in relation to the change in the suction chamber pressure Ps by adjusting the pressure-receiving area of the clearance seal portion on which the suction chamber pressure Ps acts. The dimensions of bellows, valve elements, and the like, which have conventionally been designed individually in accordance with the properties of individual variable capacity compressors, can now be matched to the properties of individual variable capacity compressors without making major design changes.

The responsiveness of the control chamber pressure Pc in relation to the change in the suction chamber pressure Ps can be improved, so even if the suction chamber pressure Ps of the variable capacity compressor deviates from the set suction chamber pressure Pset, the control chamber pressure Pc changes immediately in accordance with the change in the differential pressure (Pc−Ps), such that the suction chamber pressure Ps quickly reverts to the set suction chamber pressure Pset.

Fourth Embodiment

Figure 7:
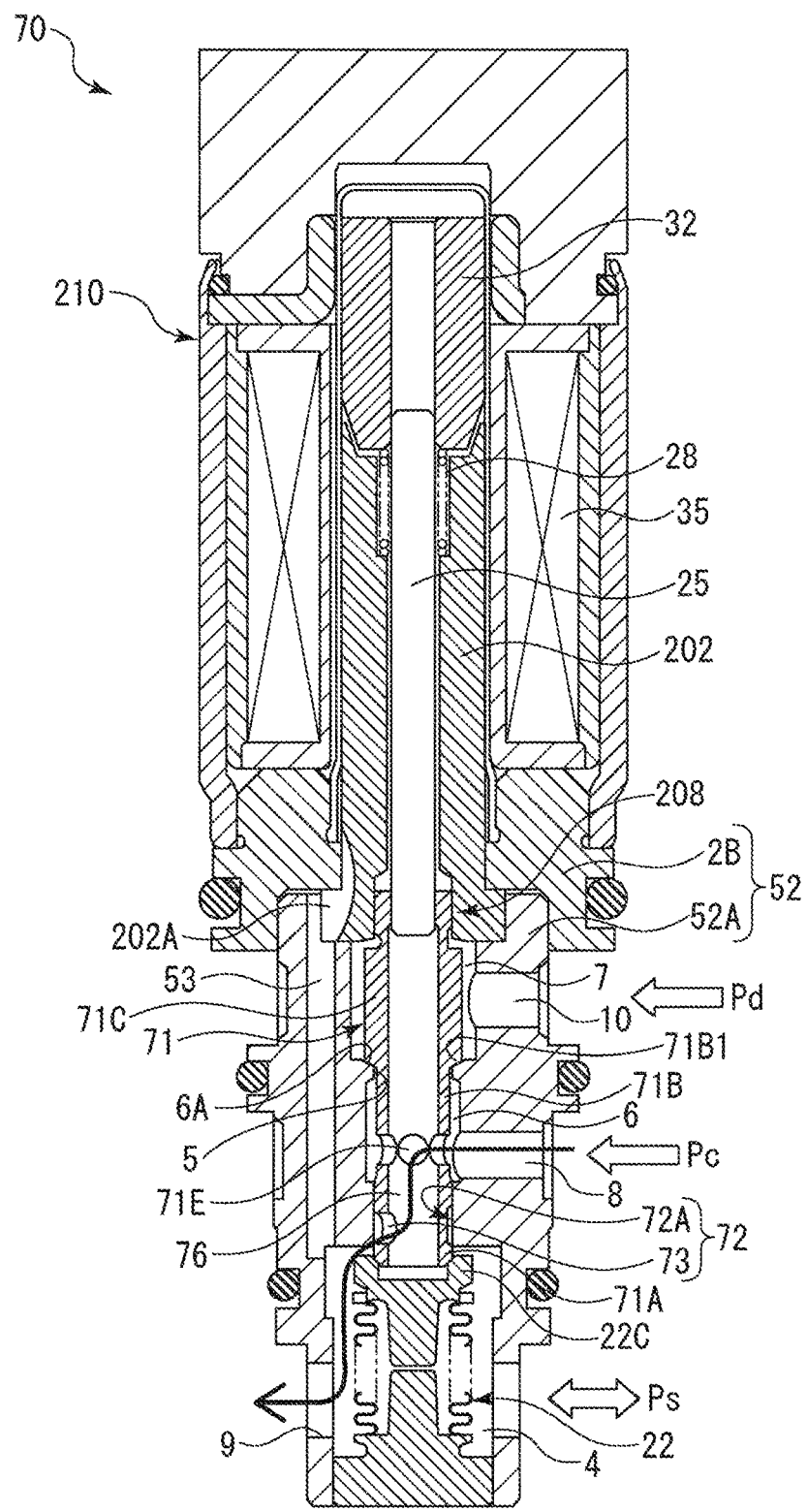
FIG. 7 is a front section view showing a capacity control valve according to a fourth embodiment of the present invention.
Figure 8:
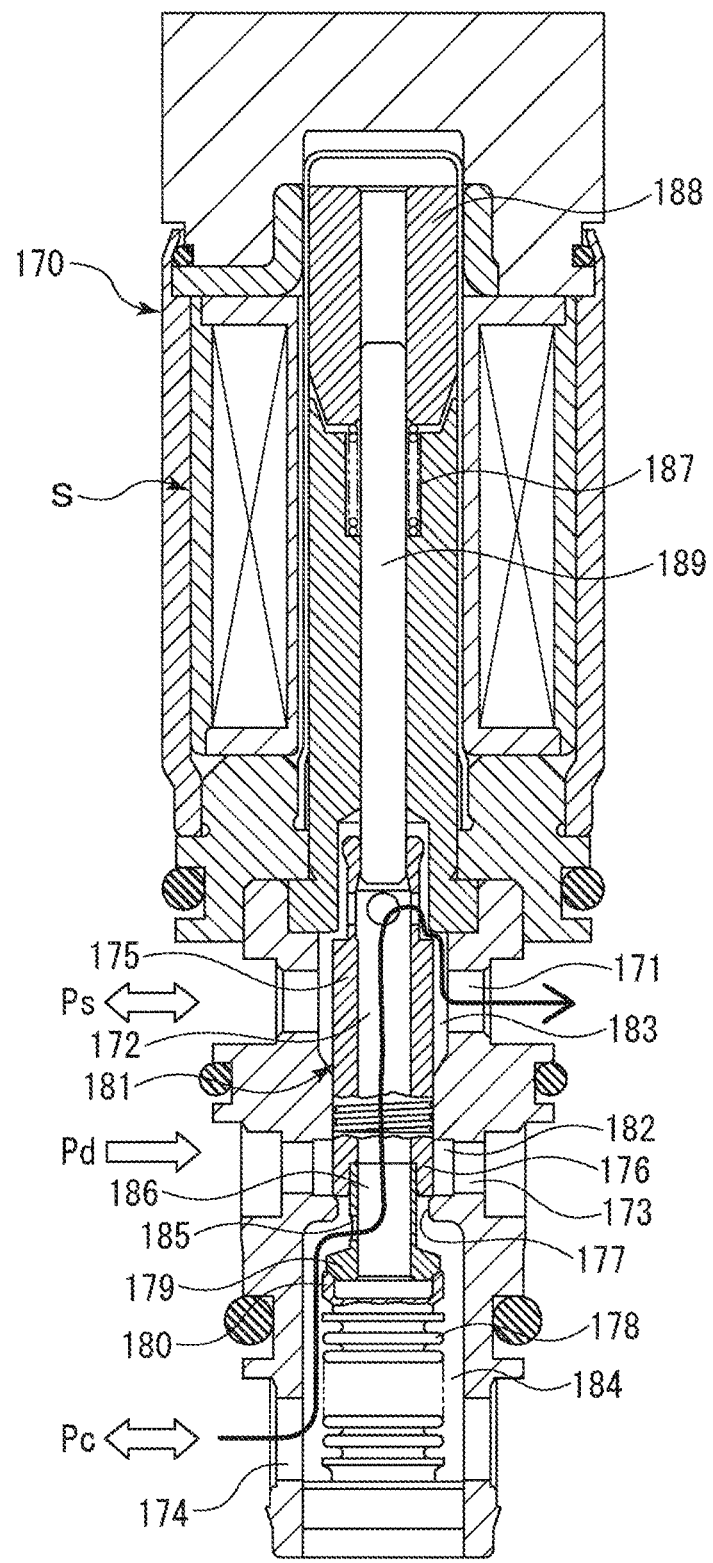
FIG. 8 is a front section view showing a capacity control valve of a conventional art.
Figure 9:
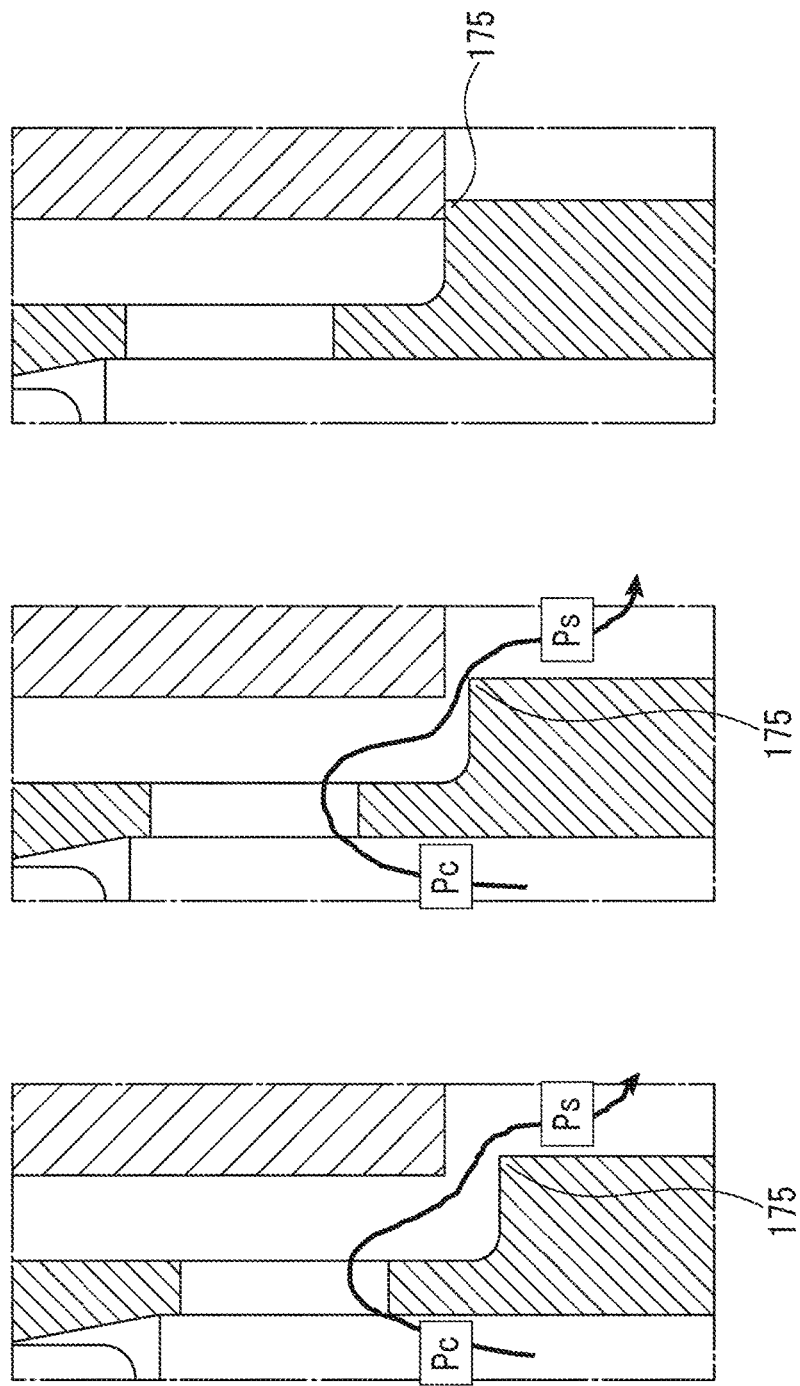
FIG. 9 is an enlarged view of a Pc-Ps flow path in the capacity control valve according to the conventional art, showing open and closed states of a valve portion of a valve element in various circumstances.
Figure 10:
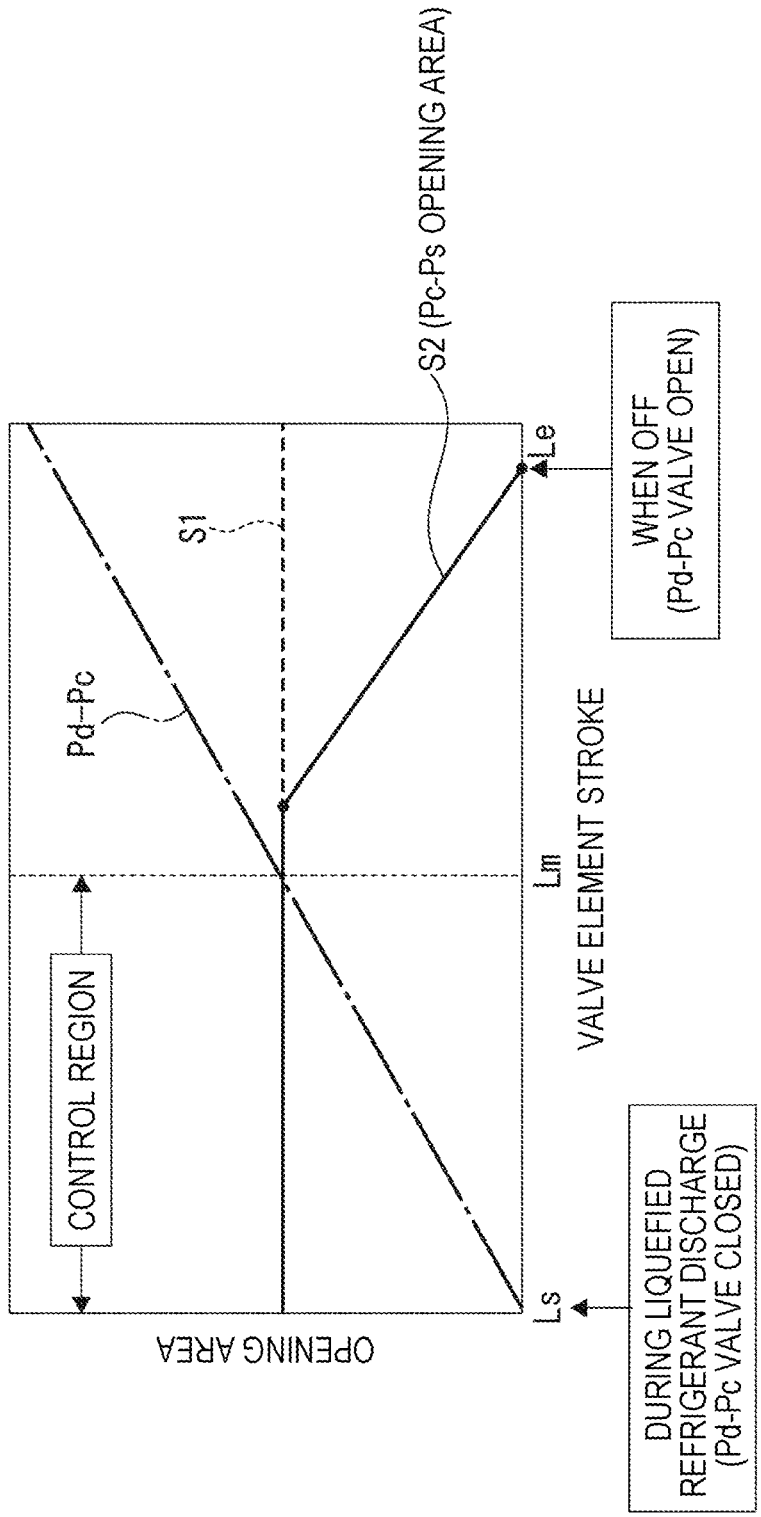
FIG. 10 is a figure showing relationships between a stroke of the valve element and opening areas of the Pc-Ps flow path and a Pd-Pc flow path of the capacity control valve according to the conventional art.

A capacity control valve 70 according to a fourth embodiment of the present invention will be explained with reference to FIG. 7. The capacity control valve 70 according to the fourth embodiment mainly differs from the capacity control valve 60 of the third embodiment in that the fluid under the discharge chamber pressure Pd is introduced into the first valve chamber 7 of the first valve body 52A, and the fluid under the control chamber pressure Pc is introduced into the second valve chamber 6. The same reference numerals will be used for members that are the same as in the capacity control valve 60, and redundant explanations will be omitted.

The first valve body 52A includes the first valve chamber 7, the second valve chamber 6, and the third valve chamber 4, the first valve chamber 7 communicating with the first communication passages 10, through which the fluid under the discharge chamber pressure Pd passes, and having the second valve seat face 6A, the second valve chamber 6 having the first valve hole 5, which communicates with the first valve chamber 7, and communicating with the second communication passages 8, through which the fluid under the control chamber pressure Pc passes, and the third valve chamber 4 communicating with the third communication passages 9, through which the fluid under the suction chamber pressure Ps passes.

A valve element 71 includes a second valve portion 71B, an intermediate communication passage 76, and a third valve portion 71A, the second valve portion 71B separating from and coming into contact with the second valve seat face 6A in order to open and close the first valve hole 5, through which the first valve chamber 7 and the second valve chamber 6 communicate with one another, the intermediate communication passage 76 allowing the second valve chamber 6 and the third valve chamber 4 to communicate with one another through auxiliary communication passages 71E and communication holes 73, and the third valve portion 71A opening and closing the third valve chamber 4 and the intermediate communication passage 76 by separating from and coming into contact with the third valve seat face 22C of the pressure-sensitive element 22. Unlike in the first to the third embodiments, the valve element 71 does not include a first valve portion disposed in the first valve chamber 7 and performing opening and closing operations in the opposite direction from the second valve portion 71B.

A throttle valve portion 72 is provided that includes the communication holes 73 and a second valve hole 72A, the communication holes 73 allowing the third valve chamber 4 and the intermediate communication passage 76 to communicate with one another between the third valve portion 71A and the second valve portion, and the second valve hole 72A being provided between the second valve chamber 6 and the third valve chamber 4. The amount of the narrowing of the throttle valve portion 72 is large when a second valve portion face 71B1 of the second valve portion 71B starts to separate from the second valve seat face 6A and the valve initially opens, and then becomes less after the initial opening of the valve.

The capacity control valve 70 according to the fourth embodiment of the present invention, described above, achieves the significant effects hereinafter described.

When the variable capacity compressor operates to discharge the liquefied refrigerant, the liquefied refrigerant is discharged to the suction chamber from the third valve portion 71A and the communication holes 73, both of which communicate with the intermediate communication passage 76, making it possible for the liquefied refrigerant to be discharged in a short period of time. After the discharging of the liquefied refrigerant is completed, the third valve portion 71A closes, and the second valve portion 71B starts to open, shifting the variable capacity compressor to control operation. At this time, the throttle valve portion 72 is significantly narrowed, so the flow of refrigerant gas from the control chamber to the suction chamber can be decreased rapidly, making it possible to improve the operating efficiency of the variable capacity compressor throughout the entire control region.

Because the induction hole 53 is provided in the first valve body 52A, the fluid under the suction chamber pressure Ps can be introduced into the rear side of the plunger case 34 from the third valve chamber 4, making it possible to adjust the responsiveness of the control chamber pressure Pc in relation to the change in the suction chamber pressure Ps by adjusting the pressure-receiving area of the clearance seal portion on which the suction chamber pressure Ps acts. The dimensions of bellows, valve elements, and the like, which have conventionally been designed individually in accordance with the properties of individual variable capacity compressors, can now be matched to the properties of individual variable capacity compressors without making major design changes.

REFERENCE SIGNS LIST 1 capacity control valve
2 valve body
3 partition adjustment portion
4 third valve chamber
5 first valve hole
6 second valve chamber
6A second valve seat face
7 first valve chamber
8 second communication passage
9 third communication passage
10 first communication passage
12 throttle valve portion
12A second valve hole
21 valve element
21A third valve portion
21B second valve portion
21C first valve portion
21E auxiliary communication passage
22 pressure-sensitive element
22A bellows
22B valve seat portion
22C third valve seat face
23 communication hole
25 solenoid rod
26 intermediate communication passage
28 spring means
30 solenoid portion
31 stator core
31A first valve seat face
32 plunger
33 solenoid case
34 plunger case
35 electromagnetic coil
36 gap portion
Pd discharge chamber pressure
Ps suction chamber pressure
Pc control chamber pressure
S1 auxiliary communication passage area
S2 throttle valve portion opening area

The invention claimed is:

1. A capacity control valve controlling, in accordance with a degree of opening of a valve portion, a flow rate or a pressure inside an operation control chamber, the capacity control valve, comprising:
a valve body having a first valve chamber, a second valve chamber, and a third valve chamber, the first valve chamber communicating with a first communication passage, through which a fluid under a control chamber pressure passes, and having a first valve seat face and a second valve seat face, the second valve chamber having a first valve hole, which communicates with the first valve chamber, and the second valve chamber communicating with a second communication passage, through which a fluid under a discharge chamber pressure passes, and the third valve chamber communicating with a third communication passage, through which a fluid under a suction chamber pressure passes;
a pressure-sensitive element disposed in the third valve chamber, extending and contracting in reaction to the suction chamber pressure and having a third valve seat face disposed on an extending and contracting free end;
a valve element having an intermediate communication passage, a second valve portion, a first valve portion, and a third valve portion, the intermediate communication passage allowing the first valve chamber and the third valve chamber to communicate with one another through an auxiliary communication passage, the second valve portion opening and closing the first valve hole by separating from and coming into contact with the second valve seat face, the first valve hole allowing the first valve chamber and the second valve chamber to communicate with one another, the first valve portion opening and closing the auxiliary communication passage by moving in conjunction with the second valve portion, and the third valve portion opening and closing the intermediate communication passage and the third valve chamber by separating from and coming into contact with the third valve seat face;
a solenoid portion attached to the valve body and having an electromagnetic coil portion, a plunger, a stator core, and a rod connecting the plunger to the valve element, the solenoid portion operating to open and close the individual valve portions of the valve element in accordance with an electric current flowing through the electromagnetic coil portion; and
a throttle valve portion having a communication hole, disposed between the second valve portion and the third valve portion and allowing the intermediate communication passage and the third valve chamber to communicate with one another, and a second valve hole, disposed between the second valve chamber and the third valve chamber,
wherein
an amount of narrowing of the throttle valve portion in relation to a stroke of the valve element is set larger during an initial valve opening, when the second valve portion separates from the second valve seat face, than the amount of narrowing after the initial valve opening.

2. The capacity control valve according to claim 1, wherein
the valve body is provided with an induction hole making the third valve chamber and the solenoid portion communicate with one another to regulate the control chamber pressure relative to the suction chamber pressure.

3. The capacity control valve according to claim 2, wherein
a gap portion between the rod and the stator core of the solenoid portion is provided with a clearance seal portion regulating the control chamber pressure relative to the suction chamber pressure.

4. The capacity control valve according to claim 2, wherein
a gap portion between the valve element and the stator core of the solenoid portion is provided with a clearance seal portion regulating the control chamber pressure relative to the suction chamber pressure.

5. A capacity control valve controlling, in accordance with a degree of opening of a valve portion, a flow rate or a pressure inside an operation control chamber, the capacity control valve, comprising:
a valve body having a first valve chamber, a second valve chamber, and a third valve chamber, the first valve chamber communicating with a first communication passage, through which a fluid under a discharge chamber pressure passes, and having a second valve seat face, the second valve chamber having a first valve hole, which communicates with the first valve chamber, and the second valve chamber communicating with a second communication passage, through which a fluid under a control chamber pressure passes, and the third valve chamber communicating with a third communication passage, through which a fluid under a suction chamber pressure passes;

a pressure-sensitive element disposed in the third valve chamber, extending and contracting in reaction to the suction chamber pressure and having a third valve seat face disposed on an extending and contracting free end;

a valve element having a second valve portion, an intermediate communication passage, and a third valve portion, the second valve portion opening and closing the first valve hole by separating from and coming into contact with the second valve seat face, the first valve hole allowing the first valve chamber and the second valve chamber to communicate with one another, the intermediate communication passage allowing the second valve chamber and the third valve chamber to communicate with one another through an auxiliary communication passage, and the third valve portion opening and closing the third valve seat face, which allows the intermediate communication passage and the third valve chamber to communicate with one another;

a solenoid portion attached to the valve body and having an electromagnetic coil portion, a plunger, a stator core, and a rod connecting the plunger to the valve element, the solenoid portion operating to open and close the individual valve portions of the valve element in accordance with an electric current flowing through the electromagnetic coil portion; and a throttle valve portion having a communication hole, disposed between the second valve portion and the third valve portion and allowing the intermediate communication passage and the third valve chamber to communicate with one another, and a second valve hole, disposed between the second valve chamber and the third valve chamber, wherein an amount of narrowing of the throttle valve portion in relation to a stroke of the valve element is set larger during an initial valve opening, when the second valve portion separates from the second valve seat face, than the amount of narrowing after the initial valve opening.

6. The capacity control valve according to claim 5, wherein the valve body is provided with an induction hole making the third valve chamber and the solenoid portion communicate with one another to regulate the control chamber pressure relative to the suction chamber pressure.

7. The capacity control valve according to claim 6, wherein a gap portion between the rod and the stator core of the solenoid portion is provided with a clearance seal portion regulating the control chamber pressure relative to the suction chamber pressure.

8. The capacity control valve according to claim 6, wherein a gap portion between the valve element and the stator core of the solenoid portion is provided with a clearance seal portion regulating the control chamber pressure relative to the suction chamber pressure.

* * * * *